United States Patent
Patel et al.

(10) Patent No.: US 12,015,620 B2
(45) Date of Patent: Jun. 18, 2024

(54) RECONSTRUCTING A DATASET AFTER DETECTION OF A NETWORK SECURITY THREAT IN A NETWORK

(71) Applicant: Vocalink International Limited, London (GB)

(72) Inventors: Prina Rajendra Kumar Patel, Coulsdon (GB); David William Divitt, London (GB); James Hogan, London (GB); Szymon Nikodem Prajs, Ascot (GB)

(73) Assignee: VOCALINK LIMITED, London (GB)

( * ) Notice: Subject to any disclaimer, the term of this patent is extended or adjusted under 35 U.S.C. 154(b) by 404 days.

(21) Appl. No.: 17/357,981

(22) Filed: Jun. 25, 2021

(65) Prior Publication Data

US 2021/0409427 A1    Dec. 30, 2021

(30) Foreign Application Priority Data

Jun. 25, 2020   (EP) .................................. 20182262

(51) Int. Cl.
*H04L 9/40* (2022.01)
*H04L 43/062* (2022.01)
(Continued)

(52) U.S. Cl.
CPC ........ *H04L 63/1416* (2013.01); *H04L 43/062* (2013.01); *H04L 47/2441* (2013.01);
(Continued)

(58) Field of Classification Search
CPC ............... H04L 63/1416; H04L 43/062; H04L 47/2441; H04L 47/2483; H04L 63/0236; H04L 63/1425
See application file for complete search history.

(56) References Cited

U.S. PATENT DOCUMENTS 6,667,960 B1 * 12/2003 Snyder .................... H04L 41/12
                                                                370/380
9,787,640 B1   10/2017 Xie et al.
(Continued)

FOREIGN PATENT DOCUMENTS

| CN | 104869044 A | 8/2015 | |
| CN | 105471741 A * | 4/2016 | ......... H04L 45/1283 |
| CN | 106203851 A | 7/2016 | |

OTHER PUBLICATIONS

EP 20182262.4; EPO Search Report, dated Dec. 2, 2020.
(Continued)

*Primary Examiner* — Paul E Callahan
(74) *Attorney, Agent, or Firm* — Pramudji Law Group PLLC; Ari Pramudji

(57) ABSTRACT

The present disclosure concerns a computer-implemented method for reconstructing a dataset after detection of a network security threat in a network. The method comprises: determining a maximum flow for returning data associated with the network security threat to a source dataset via each of a plurality of paths through which the data has passed from the source dataset to the destination dataset; starting from the destination dataset, determining the data to be transferred to each dataset in the plurality of paths between the destination dataset and the one or more source datasets such that the data can be returned to the one or more source datasets, the data transferred in each path not exceeding the determined maximum flow for the path; adding the details of the determined amount of data to be transferred to a forensic report; and outputting the forensic report.

15 Claims, 13 Drawing Sheets

(51) Int. Cl.
*H04L 47/2441* (2022.01)
*H04L 47/2483* (2022.01)

(52) U.S. Cl.
CPC ...... *H04L 47/2483* (2013.01); *H04L 63/0236* (2013.01); *H04L 63/1425* (2013.01)

(56) References Cited

U.S. PATENT DOCUMENTS

| | | |
|---|---|---|
| 2007/0089172 A1 | 4/2007 | Bare et al. |
| 2007/0294271 A1 | 12/2007 | Bammi et al. |
| 2015/0326460 A1 | 11/2015 | Wang et al. |
| 2018/0367548 A1 | 12/2018 | Stokes, III et al. |
| 2020/0160340 A1 | 5/2020 | Walters et al. |
| 2021/0044609 A1 | 2/2021 | Keshtkarjahromi |

OTHER PUBLICATIONS

Stavrou, et al.; A Survey on Secure Multipath Routing Protocols in WSNs; Computer Networks; vol. 54, Issue 13; Mar. 3, 2010.

Feng, et al.; UC-Secure Source Routing Protocol; Internatioanl Association for Cryptologic Research; Feb. 19, 2009.

\* cited by examiner

RECONSTRUCTING A DATASET AFTER DETECTION OF A NETWORK SECURITY THREAT IN A NETWORK

FIELD OF INVENTION

This invention relates generally to data security, and specifically to the determination of a security threat in a network and the reconstructing of a dataset after detection of the network security threat in a network.

BACKGROUND

Networks may involve multiple parties with many different connections between the entities in the network. When a security threat occurs it may be essential to determine which network entities have received the data associated with the security threat and from where it has originated.

This is particularly an issue as it will only be identified that a security threat has occurred a period of time after the security threat actually took place. In a short period of time the affected data may have been passed between numerous entities in the network. This makes it difficult to trace the path of the data has taken. Even in networks involving a small number of parties it can become difficult to trace the movement of the data from one entity to another.

Likewise, if it is identified that an entity within a network has data associated with it that has not been legitimately acquired, it can be a hard task to determine from where this data originated. This prevents the determination of the source of the threat, and means that the data cannot be returned or the necessary action taken to ensure no further data breaches.

Once it has been determined where the data has originated from the next task is to return the data back to where it was illegitimately acquired from. There are complications in that the amount of data that is still present at the time when the network security threat has been identified may be less than that what was originally obtained. Therefore, a strategy is required for returning the data.

The present invention aims to solve one or more of the problems mentioned above, and in particular may enable the analysis of a network to provide an identification of where data associated with a network security threat has originated and how to should be returned.

SUMMARY OF THE INVENTION

In a first aspect of the invention there is provided a computer-implemented method for reconstructing a dataset after detection of a network security threat in a network, the method comprising: determining a maximum flow for returning data associated with the network security threat to a source dataset via each of a plurality of paths through which the data has passed from the source dataset to the destination dataset; starting from the destination dataset, determining the data to be transferred to each dataset in the plurality of paths between the destination dataset and the source dataset such that the data can be returned to the source dataset, the data transferred in each path not exceeding the determined maximum flow for the path; adding the details of the determined amount of data to be transferred to a forensic report; and outputting the forensic report.

Preferably, the method further comprises determining the plurality of paths, wherein each of the paths comprises a plurality of network events responsible for the transfer of the data associated with the network security threat; each network event being between neighbouring datasets in the path, and each network event comprising: an obtaining network event through which the data associated with the security threat is originally obtained, and a returning network event which flows in the reverse direction to the obtaining network event and through which the data associated with the security threat is to be returned.

Preferably, determining the maximum flow comprises: (a) determining a theoretical capacity for each of the returning network events; (b) for a first of the paths: determining a maximum flow for all of the returning network events of the first path, the maximum flow being equal to the determined theoretical capacity of the returning network events in the first path that has the lowest value, such that the same maximum flow applies to all of the returning network events of the first path; (c) repeating step (b) for each of the paths; wherein if one or more returning network events are associated with multiple paths the maximum flow of these particular returning network events is updated to be the smaller of: the determined theoretical capacity of the returning network events associated with multiple paths that has the lowest value; or a sum of the lowest determined theoretical capacity of the returning network events in each of the paths that the one or more returning network events are associated with.

Preferably, the theoretical capacity for a returning network event, is equal to the value of the data sent in its associated obtaining network event.

Preferably, the destination dataset comprises the data associated with the network security threat.

Alternatively, the destination dataset may not have received the data associated with the network security threat. The method may further involve assigning the data associated with the network security threat to the destination dataset for the purposes of determining the maximum flow and determining the data to be transferred to each dataset in the plurality of paths. This may or may not involve the data actually being received at the destination dataset.

Preferably, determining the maximum flow comprises implementing an Edmonds-Karp algorithm.

Preferably, wherein when the network comprises a plurality of source datasets: before determining the maximum flow: generating a dummy dataset and dummy network events flowing between the dummy dataset and each of the source datasets; after determining the maximum flow: removing the dummy dataset and dummy network events before the step of determining the data to be transferred to each dataset such that the data can be returned to the source datasets.

Preferably, the step of determining the data to be transferred to each dataset in the plurality of paths between the destination dataset and the source dataset further comprises: (i) starting from the destination dataset, determining the value of data to transfer through each returning network event between the destination dataset and its neighbouring datasets, the determining based on the value of the data available at the destination network dataset and the maximum flow for the path the returning network event is associated with; (ii) starting from each of the destination dataset's neighbouring datasets, determining the value of data to transfer through each returning network event between this dataset and its neighbouring datasets, the determining based on the value of the data that has been determined to be transferred to this dataset and the maximum flow for the path the returning network event is associated with; (iii) repeating step (ii) for each of the datasets along each of the paths, until it is determined how the data is to be returned to the source dataset.

Preferably, the step of determining the data to be transferred to each dataset in the plurality of paths between the destination dataset and the source dataset further comprises implementing a Breadth first search algorithm.

Preferably, the step of determining the data to be transferred to each dataset in the plurality of paths between the destination dataset and the source dataset further comprises: at each dataset where there is more than one returning network event: summing the value of the data originally sent to the dataset in each of the obtaining network events associated with that dataset; determining a percentage contribution of data each obtaining network event made to the summed total; determining the amount of data to be transferred via each of the returning network events by multiplying the contribution of its associated obtaining network event by the available value of data at the dataset, and where this exceeds the maximum flow for that returning network event setting the amount of data to be transferred to be equal to the maximum flow.

Preferably, the method further comprises automatically returning the data based on the forensic report.

Preferably, the forensic report is automatically processed by a data processing device such that the data processing device automatically returns the data.

Preferably, the network is a financial network and the network security threat is the unauthorised modification of routing information within the financial network.

In a second aspect there is provided a system configured to reconstruct a dataset after detection of a network security threat in a network, the system comprising: a dataset reconstructing module configured to: determine a maximum flow for returning data associated with the network security threat to a source dataset via each of a plurality of paths through which the data has passed from the source dataset to a destination dataset; starting from the destination dataset, determine the data to be transferred to each dataset in the plurality of paths between the destination dataset and the source dataset such that the data can be returned to the source dataset, the data transferred in each path not exceeding the determined maximum flow for the path, add the details of the determined amount of data to be transferred to a forensic report; and output the forensic report.

According to a third aspect there is provided a non-transitory computer-readable storage medium storing instructions thereon which, when executed by a processor, cause the processor to perform a method for reconstructing a dataset after detection of a network security threat in a network, the method comprising: determining a maximum flow for returning data associated with the network security threat to a source dataset via each of a plurality of paths through which the data has passed from the source dataset to the destination dataset; starting from the destination dataset, determining the data to be transferred to each dataset in the plurality of paths between the first dataset and the one or more source datasets such that the data can be returned to the one or more source datasets, the data transferred in each path not exceeding the determined maximum flow for the path; adding the details of the determined amount of data to be transferred to a forensic report; and outputting the forensic report.

The step of determining details of the network associated with the network security threat in the above aspects may be implemented by the following methods:

There is provided a computer-implemented method for forensically analysing and determining a network associated with a network security threat, the method comprising: (a) obtaining details of a flagged network event comprising data associated with a network security threat, the network event being between a first dataset and a destination dataset; (b) tracing the data associated with the network security threat from the first dataset to a further dataset, the tracing involving obtaining details of at least one past network event between the first dataset and the further dataset; (c) comparing details of the further dataset to predefined criteria to identify if the further dataset is an intermediate dataset or a source dataset from which the data originated and adding the details of the further dataset to a forensic report; (d) outputting the forensic report.

Preferably, the method further comprises if the further dataset is identified to be an intermediate dataset repeating steps b) to c) starting from that intermediate dataset until a source dataset associated with the intermediate dataset is identified, else if the further dataset is identified to be a source dataset adding details of the source dataset to the forensic report comprising details of the determined network associated with the security threat.

Preferably, once at least one source dataset has been identified: starting from the at least one source dataset or its associated intermediate dataset, tracing the data associated with the network security threat to identify one or more datasets that are different to the first and further dataset, the tracing involving identifying network events which led the one or more datasets to including the data associated with the network security threat; adding the identified one or more datasets to the forensic report.

Preferably, the predefined criteria are one or more of: whether there are any further past network events associated with data arriving at the further dataset, the number of past network events that were associated with data transfer to or from the further dataset, the time difference between past network events that were associated with data transfer to or from the further dataset, how long the data has been present in the further dataset, a geographical location associated with the further dataset.

Preferably, the details of the determined network associated with the security threat comprises a map of the network, and/or a list of past network events between the identified datasets.

Preferably, the step of obtaining details of past network events between the first dataset and the further dataset involves identifying past network events which fall within a predefined time period.

Preferably, the network is a financial network and the network security threat is the unauthorised modification of routing information within the financial network.

Preferably, the method further comprises determining a procedure for returning the data associated with the network security threat at the flagged network event to each of the identified source datasets.

Preferably, when there is more than one source dataset in the network, the step of determining a procedure for returning comprises: i. determining which network event between the first dataset and the further dataset occurred first; ii. adding details of this network event to the forensic report for future use of returning the data associated with the network security threat associated with this network event to the further dataset; and iii. if it is determined that some data associated with the network security threat will remain in the first dataset after the future returning repeating steps (i) to (iii).

Preferably, when the further dataset that the data is to be returned to is an intermediate dataset: iv. determining at this intermediate dataset which network event between this intermediate dataset and the further dataset occurred first; v. adding details of this network event to the forensic report for future use of returning the data associated with the network security threat associated with this network event to the further dataset associated with this network event; vi. if it is determined that some data associated with the network security threat will remain in the intermediate dataset after the future returning repeating steps (iv) to (vi).

Preferably, when there is more than one source dataset in the network, the step of determining a procedure for returning comprises: identifying the contribution each network event between the first dataset and the further datasets made to the data associated with the network security threat at the flagged network event; adding details of these network event and their contribution to the forensic report for future use of returning the data associated with the network security threat associated with each network event to the further datasets based on their identified contribution.

Preferably, the method further comprises for each of the datasets that the data is to be returned to that are an intermediate dataset: identifying a contribution each network event between the intermediate dataset and further datasets made to the data associated with the network security threat at the intermediate dataset; adding details of these network event and their contribution to the forensic report for future use of returning the data associated with the network security threat associated with each network event to the further datasets based on their identified contribution.

Preferably, the method further comprises returning the data based on the determined procedure for returning.

BRIEF DESCRIPTION OF THE DRAWINGS

Embodiments of the present invention are described below, by way of example only, with reference to the accompanying drawings, in which.

DETAILED DESCRIPTION OF EMBODIMENTS

Figure 1:
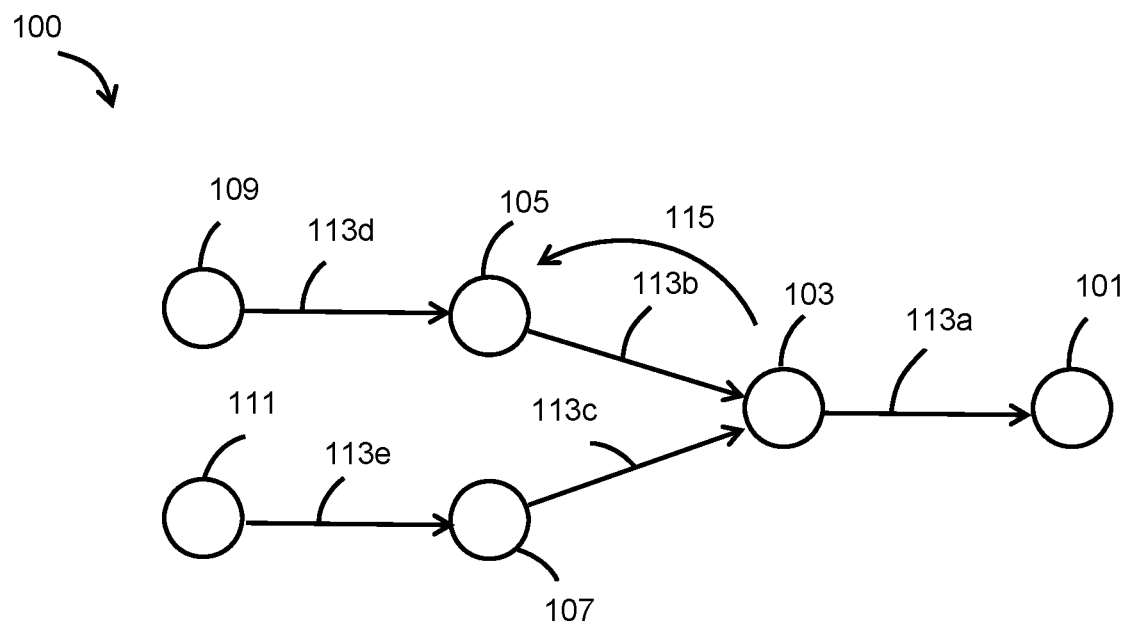
FIG. 1 is a schematic diagram of a portion of a network in accordance with an embodiment of the invention.

As used herein, the followings terms have the following meanings:

Dataset: a dataset is an entity within a network which has associated with it one or more data. The data may be stored in one or more databases associated with the dataset. Each data entry in the dataset comprises a value and an associated timestamp.

Network security threat: is an event within a network which leads to an unauthorised access, altering or movement of data within the network. An unauthorised action is any action that is not approved by the party that is in control of the dataset. This may include unauthorised access of data and the sending of said data to a dataset that is not authorised to hold said data.

Network event: a network event is an event between datasets in the network. A network event involves the movement of data from one dataset to another. A network event may be made up of a returning network event in which the data is returned to the source dataset, and an obtaining network event in which the data is obtained from the source dataset. The obtaining network event is an unauthorised movement of data between datasets.

Flagged network event: this is a network event which is initially identified to have sent data associated with the network security threat. It is a network event that is between the first dataset and the destination dataset. The flagged network event is not authorised to have sent said data. The flagged network event is the network event which may presently comprise the data acquired via the network security threat at the time that the forensic analysis of the network is being performed, or the network event that most recently comprised said data. The destination dataset may have received the data associated with the network security event from the first dataset.

Destination dataset: this is the dataset to which the flagged network event is sending the data associated with the network security threat to. It is the intended destination of the flagged network event. It is not authorised to receive said data. The destination dataset may comprise the data associated with the network security threat from the flagged network event. Alternatively, the destination dataset may not have received the data in the flagged network event.

First dataset: this is the dataset from which the flagged network event is sending the data associated with the network security threat to the destination dataset.

Source dataset: this is a dataset from which the data associated with the network security threat originated when it was accessed/obtained without authorisation. The source dataset may be a dataset that has comprised the data for a certain period of time. Alternatively, or in addition, the source dataset may have been authenticated as being the owner of the data that has been accessed/obtained without authorisation.

Intermediate dataset: this is a dataset that is in the path of the flow of data associated with the network security threat between the source dataset and the destination dataset. There may be multiple intermediate datasets in the path of the flow of data between the source dataset and the destination dataset. The first dataset may also be an intermediate dataset.

Forensic report: this comprises details of the determined network associated with the security threat. It includes details of each of the sources, and intermediate datasets that have been identified. The forensic report may be in the form of a list of datasets and their association with each other. Alternatively, or in addition, the forensic report may comprise a map of the network. This may comprise a layout of the network datasets and the network events between them showing the flow of the data associated with the network security threat between the source and destination dataset. Alternatively, or in addition, the forensic report may comprise details of the amount of data to be returned to each of the source datasets. This may include details of how much data is returned to each dataset in the path between the destination dataset and the source dataset.

FIG. 1 is a schematic diagram showing a portion of a network 100 in accordance with an embodiment of the invention. The network 100 includes a number of nodes, otherwise referred to as datasets 101, 103, 105, 107, 109, 111. Each dataset may comprise one or more items of data. In the network 100 shown in FIG. 1 dataset 101, otherwise herein referred to as destination dataset 101. Dataset 103 is the first dataset.

Between each of the datasets are a series of network events 113. These network events 113 illustrate the path the data associated with the network security threat has travelled through the network 100 to arrive at the destination dataset 101.

Network event 113a is the flagged network event. Flagged network event 113a includes the data associated with a network security threat. The flagged network event 113a may have provided the data to the destination dataset 101, such that the destination dataset 101 comprises said data. Alternatively, the flagged network event 113a may have been prevented from actually transferring the data to the destination dataset 101.

Initially it may not be known where the data associated with the network security threat has come from. It may also not be known the complete path by which it has arrived at the first dataset 103 and then sent in the flagged network event 113a. All that might be known is that the flagged network event 113a comprises data associated with the network security threat, and in some instances the first dataset 103 that has sent the flagged network event 113a. The destination dataset 101 may also be known. In other words, the network map may originally only comprise destination dataset 101, the flagged network event 113a, and possibly dataset 103. Datasets 107, 109, and 111 may not be known. The network events from these datasets may also not be known. This can lead to problems as it might be desirable to return the data to the source datasets from which it originated. It may also be necessary to know where the data has originated to prevent further security threats from occurring. It is therefore desirable to determine these datasets and network events in order to determine where the data has originated. This can allow the network map as shown in FIG. 1 to be determined which shows the path by which the data has taken from the source datasets 109 and 111 to the first dataset 103.

Flagged network event 113a that comprises data associated with the network security threat and details of destination dataset 101 may be obtained. For instance, they may be provided by a third party. The third party may be aware that dataset 101 is involved in receiving data associated with the network security threat through network event 113a.

By obtaining this information the path through which the data associated with the network security threat has taken can be determined. It may then be known that the flagged network event 113a has originated from first dataset 103. This may be also provided by the third party. Alternatively, this may be derivable through looking at the details of the network event 113a.

Once first dataset 103 is identified by the knowledge of network event 113a, it may be determined if this dataset 103 is the source of the data, i.e. where the data associated with the network security threat originated from, or if it is an intermediate dataset. In some embodiments the step of determining if the first dataset 103 is a source dataset may not be necessary as it may be already known that the first dataset 103 is not the source dataset.

The determination as to whether the dataset 103 is an intermediate or source dataset is carried out by comparing details of dataset 103 to predefined criteria.

The predefined criteria may be a particular profile of an intermediate dataset. Alternatively, or in addition, the predefined criteria may be a particular profile of a source dataset. This could be any of whether there are any further past network events associated with data arriving at the further dataset, the number of past network events that were associated with data transfer to or from the further dataset, the time difference between past network events that were associated with data transfer to or from the further dataset, how long the data has been present in the further dataset, a geographical location associated with the further dataset.

Whether there are any further past network events associated with data arriving at a dataset can indicate whether the dataset is a source dataset. A dataset having no incoming network events can be classified as a source dataset. A dataset having incoming network events can be classified as an intermediate dataset. This determination of whether there are any further past network events may be whether there are past network events that fall within a predetermined period. This is because a source dataset may still have received the data that originates from the source dataset from a further dataset at a point in the past. However, it is only network events related to the network security threat that are of interest. This predetermined time period will be sufficiently long enough to ensure that the previous transactions are not related to the network security threat.

The number of past network events that were associated with data transfer to or from the first dataset 103 may also by an indicator as to whether the dataset 103 is an intermediate or source dataset. If the number of past network events is high it may indicate that the dataset is an intermediate dataset.

The time difference between past network events that were associated with data transfer to or from the identified dataset 103 can be an indicator as to whether the dataset 103 is an intermediate or source dataset. For instance, if there is a short time difference between the data arriving at the first dataset 103 and being subsequently sent to the destination dataset 101 this may indicate that the dataset 103 is an intermediate dataset. It may also reinforce the fact that the first dataset 103 is related to the network security threat. This is because data associated with a network security threat may be transferred quickly through the network. Thus, fast transfers of data may indicate an intermediate node involved in transferring data associated with a network security threat. A quick transfer means that the security threat is passed to more nodes within a set period of time. It may also mean that the data is sent further from the source dataset and thus is harder to trace. Therefore, this predefined criteria recognises this and uses this to trace the data.

The geographical location may provide an indication as to whether the dataset is an intermediate dataset or a source dataset. The geographical location associated with the identified dataset may mean that the dataset is stored in a database that is associated with a particular region or country.

In a similar way, the length of time data associated with the network security threat has been present in the dataset 103 can also be used to determine if the first dataset 103 is an intermediate dataset or a source dataset. As the data associated with the network security threat originates from the source dataset, it will have been present at the source dataset for a longer period of time than at the intermediate dataset. A dataset where the data associated with the network security threat is only present for a short period of time may indicate that it is an intermediate dataset.

As can be seen in FIG. 1 dataset 103 is an intermediate dataset. The data associated with the network security threat has not originated from this dataset. To identify where the data associated with the network security threat has originated past network events between the intermediate dataset 103 and one or more further datasets are identified.

Network event 113b between first dataset 103 and dataset 105 is identified as contributing to the data associated with the network security threat. Network event 113c between first dataset 103 and dataset 107 is also identified as contributing to the data associated with the network security threat. In this way the data associated by the network security threat is a combination of data from datasets 105 and 107.

Determining whether the network events are associated with the transfer of the data associated with the network security threat may be carried out by only considering network events that fall within a certain time period (i.e. a certain dwell time). These network events may be attributed to the network security threat.

For instance, it may be known that the network security threat started at a certain time. Limiting the searching of past network events around this time can lead to the determination of only network events that are related to this network security threat. In this way, previous events that occurred before the network security threat occurred are not considered. Alternatively, the time period may be within a certain time since it was determined that there was a network security threat. As it might be expected that the network security threat will have occurred around the same time as the detection.

As illustrated in FIG. 1, network event 113b is identified between first dataset 103 and dataset 105. Network event 113b is the sending of the data associated with the network security threat from dataset 105 to first dataset 103. In other words, network event 113b is the receiving of data associated with the network security event at the first dataset 103 from dataset 105. The tracing of the network event 113b from the dataset 105 to dataset 103 is shown by arrow 115. This is likewise the case for network event 113c but between dataset 107 and first dataset 103.

The data associated with the network security threat is traced through each of network events 113b and 113c to datasets 105 and 107 respectively. Dataset 105 is then identified to be an intermediate dataset, in the manner as outlined above for first dataset 103. Likewise dataset 107 is also identified to be an intermediate dataset using the steps outlined above for the first dataset.

The data associated with the network security threat is then traced as arriving at intermediate dataset 105 from dataset 109 through network event 113d. Dataset 109 is then compared to predefined criteria, as outlined above, to identify if it is an intermediate dataset or a source dataset. Dataset 109 is identified as being a source dataset. The data associated with the network security threat (or a portion thereof) has originated from the source dataset 109.

The data associated with the network security threat is also traced as arriving at intermediate dataset 107 from dataset 111 through network event 113e. Dataset 111 is then compared to predefined criteria, as outlined above, to identify if it is an intermediate dataset or a source dataset. Dataset 111 is identified as being a source dataset. The data associated with the network security threat (or a portion thereof) has originated from the source dataset 111.

The above enables a map of a portion of the network 100 to be determined showing the flow of data associated with the network security threat through the network. The flow of the data starts from the data sources 109 and 111 and arrives at the first dataset 103, via intermediate datasets 105, 107, 103, and then at the flagged network event.

Details of the portion of the network 100 can be output as a forensic report. As each source dataset 109 111 is identified they can be added to the forensic report. In addition, as each intermediate dataset 103 105 107 is identified the intermediate datasets can be added to the forensic report. The forensic report may display the map of the portion of the network 100 as shown in FIG. 1. Alternatively, or in addition, the forensic report may include a list of the datasets identified, along with details of the network events identified between the datasets.

In other scenarios, the forensic report may be created once the network 100 has been determined rather than when each node is identified.

Figure 2:
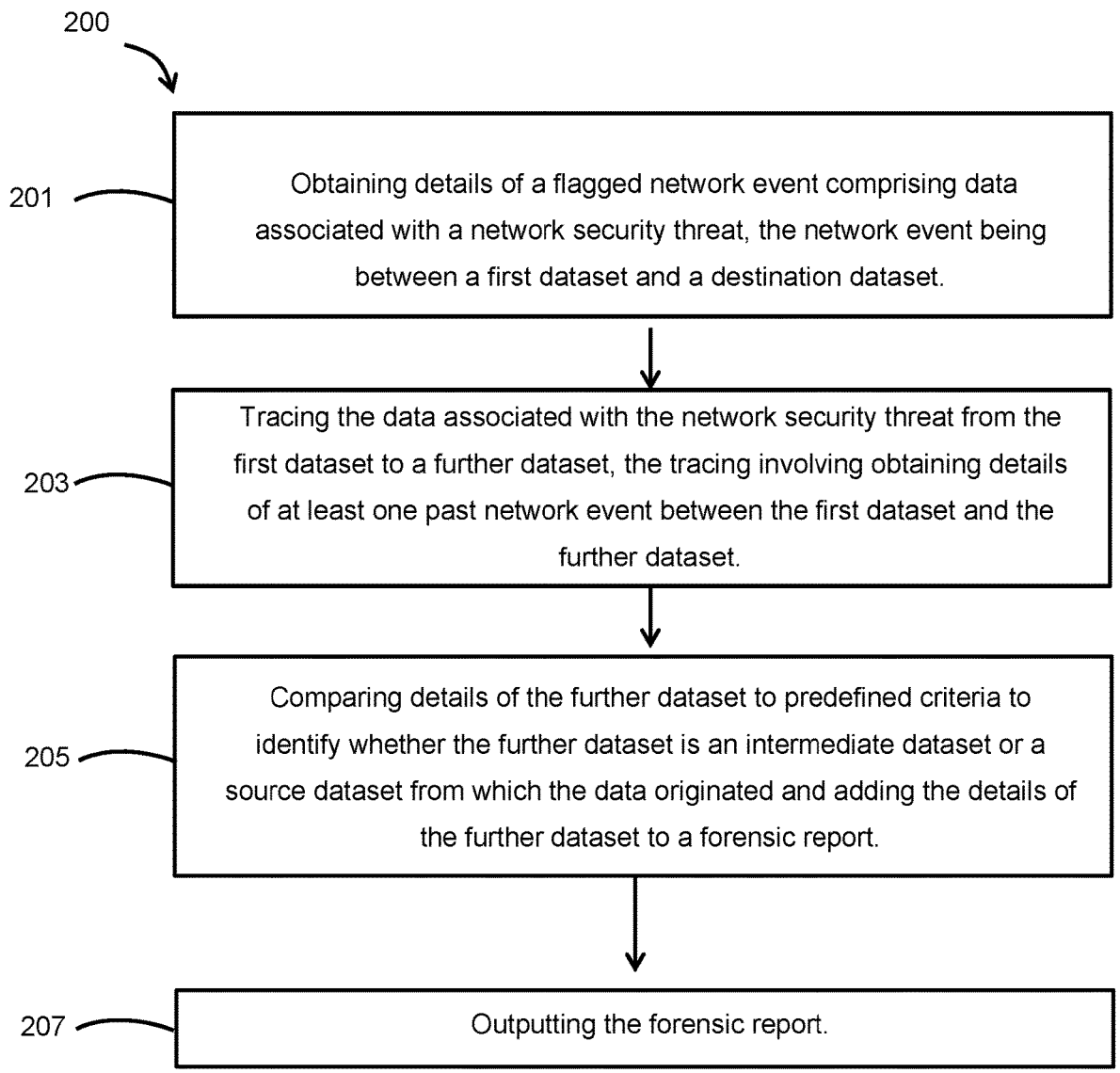
FIG. 2 is a first flow chart setting out a method in accordance with an embodiment of the invention.

FIG. 2 is a first flow chart setting out a method in accordance with an embodiment of the invention.

Step 201 involves obtaining details of a flagged network event comprising data associated with a network security threat, the network event being between a first dataset and a destination dataset.

In step 203 the data associated with the network security threat is traced from the first dataset to a further dataset, the tracing involving obtaining details of at least one past network event between the first dataset and the further dataset.

As step 205 details are compared the further dataset to predefined criteria to identify whether the further dataset is an intermediate dataset or a source dataset from which the data originated and adding the details of the further dataset to a forensic report. The predefined criteria may be criteria that demonstrate a distinction between characteristics of an intermediate dataset and a source dataset.

A forensic report is then output at step 207. The forensic report may include details of the one or more datasets identified within the network as being associated with the network security threat.

Optionally, the method may further involve if any of the one or more further datasets are identified to be an intermediate dataset repeating steps (203) to (205) starting from that intermediate dataset until a source dataset associated with the intermediate dataset is identified. Else if the further dataset is identified to be a source dataset adding details of the source dataset to a forensic report comprising details of the determined network associated with the security threat.

This may be expressed by the following steps:
A. if any of the one or more further datasets are identified to be an intermediate dataset:
   i) tracing the data associated with the network security threat from the identified intermediate dataset to one or more further datasets, the tracing involving identifying at least one past network event between the identified intermediate dataset and the one or more further datasets;
   ii) comparing details of each of the one or more further datasets to predefined criteria to identify if each of the one or more further datasets are an intermediate dataset or a source dataset from which the data originated;
B. repeating step A) starting from each identified intermediate dataset identified in step ii) until a until a source dataset is identified in step ii);
C. adding details of the identified source datasets to a forensic report comprising details of the determined network associated with the security threat;

The network associated with the network security threat as determined using the method 200 may be the portion of the network 100 shown in FIG. 1.

Figure 3:
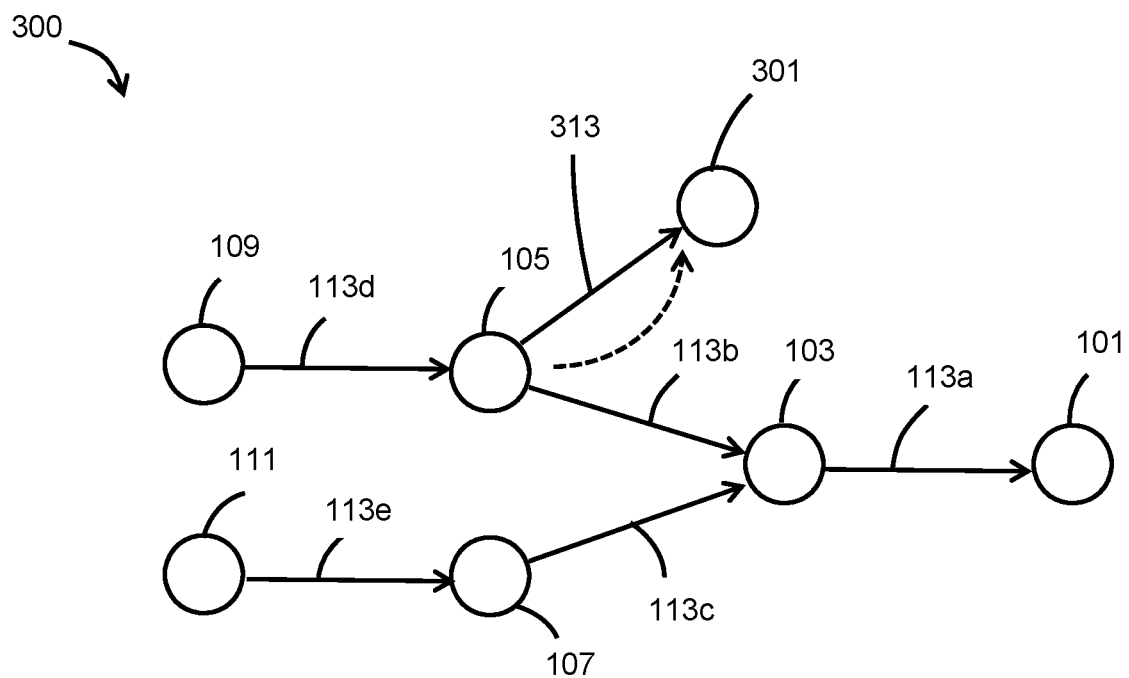
FIG. 3 is a schematic diagram of a network in accordance with an embodiment of the invention.

FIG. 3 is a schematic diagram showing a network 300 in accordance with an embodiment of the invention. Network 300 includes the portion of the network 100 as identified using the method 200 shown in FIG. 2 and in FIG. 1. In FIG. 3 like reference numerals are used for the same components as shown in FIG. 1.

After the portion of the network 100 associated with the network security threat has been identified using the method 200 described above, it is desirable to determine if data associated with the network security threat originating from the source datasets 109 and 111 has been passed to one or more further datasets that have not been identified. In this way, it is possible to identify datasets that comprise data associated with the network security threat that otherwise might not be known about from the backward tracing as shown in FIGS. 1 and 2 described above.

Starting from the source dataset 109, network events can be determined originating from source dataset 109 that look suspicious. These network events might be a transfer of data associated with the network security threat that was not previously known about. This is because they are between the source dataset 109 and one or more datasets that have not previously been identified. The same approach as taken as described above for the backward trace may be used, i.e. network events falling within a predetermined time period may be identified to be suspicious. This time period can be the time period discussed above, such that they relate to the network security threat. The time of these network events may be the same as the time of the other network events associated with security threats from this or another dataset.

In the present case no network events are identified from the source dataset 109 that have not been determined already.

This step is then carried out at the next node in the network, intermediate dataset 105. Network event 313 is identified as originating from intermediate dataset 105 and being related to the unauthorised transfer of data associated with a network security threat. The network event 313 involves the transfer of data associated with the network security threat to dataset 301. Dataset 301 was not previously known about.

Dataset 301 may then be compared to predefined criteria, in the way as described above, to determine if it is an intermediate dataset. Alternatively, dataset 301 may be determined to be a dataset which currently holds the data associated with the network security threat. Thus, it is comparable to the destination dataset 101 (an end point for the data).

In this way, this forward tracing enables the detection of datasets that comprise data associated with the network security threat that were not known about from the method 200 used to create the map of the portion of the network 100 as shown in FIG. 1. This can provide a more detailed and complete view of the network.

Even after a dataset of the type of dataset 301 has been determined, the above described forward tracing may be carried out at each dataset in the network previously identified along the path between destination dataset 101 and source dataset 109. As can be seen in FIG. 3 in this particular network no further datasets are identified as comprising data associated with the network security threat. However, it can be understood that other datasets such as dataset 103, may in other network arrangements have additional network events that lead to further datasets such as 301.

The above steps of forward tracing are also repeated starting from the source dataset 111. As can be seen in FIG. 3 no new datasets are identified in the forward tracing from source dataset 111. However, in other network arrangements one or more new datasets may be determined which comprise data associated with the network security threat.

Figure 4:
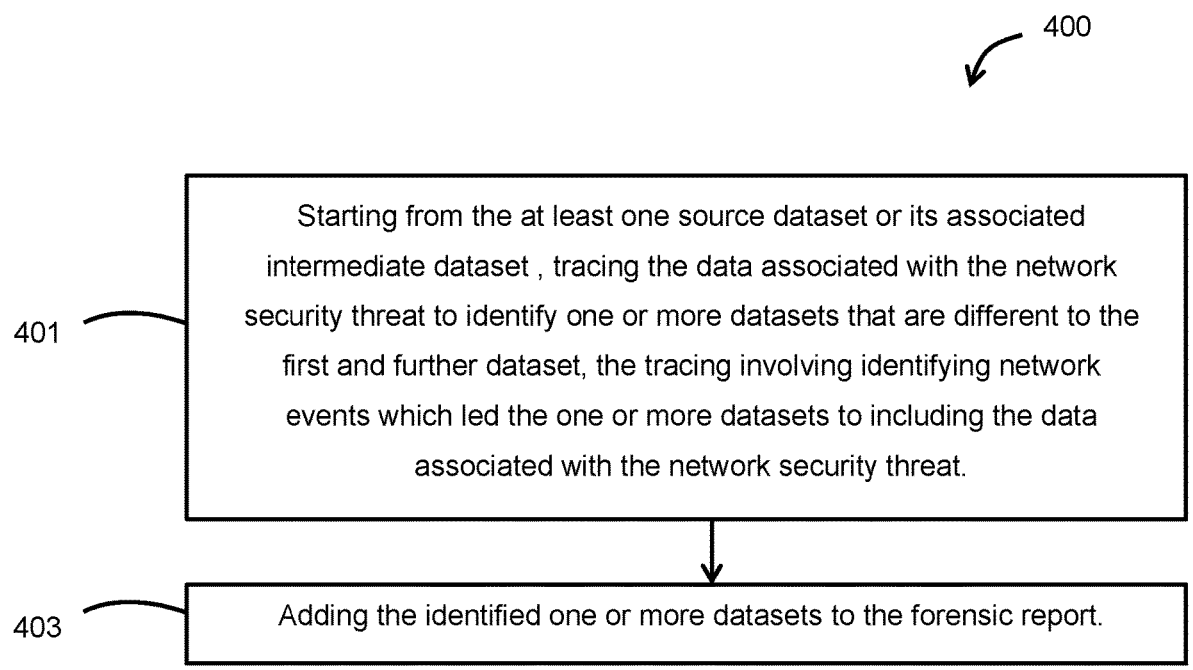
FIG. 4 is a second flow chart setting out a method in accordance with an embodiment of the invention.

FIG. 4 is a second flow chart setting out a method in accordance with an embodiment of the invention.

Step 401 involves starting from the at least one source dataset or its associated intermediate dataset, tracing the data associated with the network security threat to identify one or more datasets that are different to the first and further dataset, the tracing involving identifying network events which led the one or more datasets to including the data associated with the network security threat. The identified one or more datasets are also different to the destination dataset.

Step 403 involves adding the identified one or more datasets to the forensic report.

In some scenarios, after identifying source dataset 109 and intermediate dataset 105 through method 200, when identifying the portion of the network 100, it may be recognised that some data associated with the network security threat is not accounted for. By identifying dataset 301 though method 400 the location of this data can be determined.

Dataset 301 which comprises the data associated with a network security threat in the network is shown in FIG. 3. However, in other network scenarios there may instead be one or more intermediate datasets between dataset 105 and dataset 301. In these scenarios, the flow of the data associated with the network security threat can be traced forwards through the one or more intermediate datasets in the way outlined above, to arrive at dataset 301 which comprises the unauthorised data.

In the above, backward tracing is described as following the flow of data from the destination dataset 101 to the one or more source datasets 109 and 111. This is right to left in FIGS. 1 and 3. Forward tracing is described as following the flow of data from the one or more source datasets 109 and 111 to the destination dataset 101. This is left to right in FIGS. 1 and 3. This may be based on time, i.e. backwards is backwards in time, and forwards is tracing forward in time from the point that the trace is started from.

Each of the datasets may comprise other data, which is not related to the network security threat. Each item of data in the datasets may have a value associated with it and a timestamp. This timestamp may indicate when the data was received at that dataset.

Each network event has associated with it a value and a timestamp. The timestamp indicates the time when the network event occurred. This might be any or both of when the network event was sent from the sending dataset, or when it was received at the receiving dataset. The value of the network event may be the data that is transmitted during the network event. This may be the data associated with the network security threat.

We will now outline for the mathematical algorithm for a method of forensically analysing and determining a network as shown above in FIGS. 1 to 4.

A network event $x_t$ at time t, is represented at a 4-tuple $$x_t = (a_s, a_r, t, v),$$

where $a_s$ and $a_r$ are the sending and receiving datasets respectively and v is the value of the data being sent. We also define here an inbound network event identifier and an outbound network event identifier. These two utility functions are extensively used in the tracing part of the algorithm. Given a network event $x_{ti}$, the inbound network event identifier gives $$f_{in}: x_{ti} \rightarrow X_{in},$$

Where $$X_{in} = \{x_t | t_i - \Delta \leq t \leq t_i, (a_r) = x_{ti}(a_s)\}. \quad (1)$$

$\Delta$ is the dwell time that defines the time window of included network events and $x_{ti}(a_s)$ is the sending dataset in $x_{ti}$. Similarly, the outbound network event identifier applied on a network event $x_{ti}$ can be written as $$f_{out}: x_{ti} \rightarrow X_{out}$$

Where $$X_{out} = \{x_t | t_i \geq t \geq t_i + \Delta, x_t(a_s) = x_{ti}(a_r)\}. \quad (2)$$

$\Delta$ is as above and now $x_{ti}(a_r)$ is the target dataset in $x_{ti}$.

Starting from the flagged network event to the destination dataset (comprising the data associated with the network security threat) $x_f$ we identify the set of incoming network events to the sending dataset using the incoming network event identifier described above. This process is continually applied to the sending datasets of each included network event until sources dataset(s) are identified. Source datasets are datasets that have no inbound network events causing this part of the algorithm to come to a natural conclusion.

If we denote the outbound network event from these discovered source datasets as $X_v$ then we can write the backwards tracing part of the algorithm as $$f: x_f \rightarrow X_v,$$

relating the flagged network event $x_f$ to a set of potential network events related to a network security threat $X_v$, through a network of intermediate datasets.

Once the backward trace is complete the algorithm will take each network event in $X_v$ and trace forward from each receiving dataset using the outbound network event identifier described above. The forward tracing will rediscover all the network events from the backwards phase, but its key purpose is to identify new network events $X_e$ and new associated endpoint datasets that would not have been found by the backwards trace. This portion of the tracing algorithm stops when new endpoints with no further outbound network events are reached or the first dataset is reached. This defines the stopping criteria for the forwards trace.

If we denote all the network events found between $X_v$ and $x_f$ as $X_m$ indicating network events between all the suspect intermediate datasets and $X_e \subset X_m$ then the set of network events that make up the network $X_r$ can be written as $$X_r = \{x_f\} \cup X_m \cup X_v$$

where network events into and out of datasets respect the time properties laid out in equations 1 and 2.

Once the network 300 has been determined it may be desirable to transfer the data associated with the network security threat from the flagged network event, where it is not meant to be, back to the source datasets from where it was taken. The methods 200 and 400 described above, tracing the flow of the data both backwards and forwards, provides a detailed view of the network of datasets involved in the unauthorised transfer of the data associated with the network security threat.

If there is a single data source it can be trivial to return the data associated with the network security threat. All of the data that has been illegitimately obtained can be returned to that single data source (or at least all of the data that is present in the flagged network event).

However, if there is more than one data source it may be necessary to determine what proportion of the data associated with the network security threat is to be returned to each of the source datasets. This is particularly important if a portion of the data associated with the network security threat is no longer present at the first dataset/flagged network event, or has gone missing between the source dataset and the first dataset/flagged network event. In this situation, it might not be possible to return all of the data associated with the network security threat that was initially obtained from the source datasets.

Figure 5:
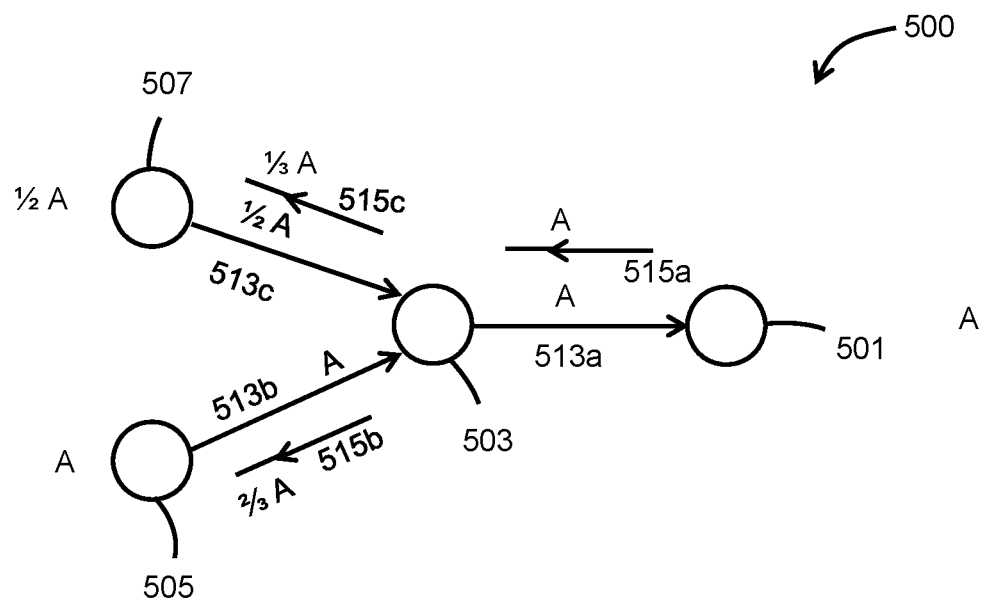
FIG. 5 is a schematic diagram of returning data to nodes of a network in accordance with an embodiment of the invention.

FIG. 5 shows a schematic diagram of returning data to nodes of a network in accordance with an embodiment of the invention. Network 500 has been determined using the methods 200 and 400 as described above in relation to FIGS. 1 to 4. In network 500 no further new datasets have been identified in the forwards trace of method 400, although it could be understood that the following steps could be equally applied to a network of this type. Network 500 includes a destination dataset 501, intermediate first dataset 503 and two source datasets 505 and 507.

Data A is obtained from source dataset 505 through a network security threat. Data A is sent via network event 513b to intermediate dataset 503.

Data ½A is obtained from source dataset 507 through network security threat. Data ½A sent via network event 513c to intermediate first dataset 503.

Intermediate dataset 503 then forwards the data A to destination dataset 501 through flagged network event 513a. These are obtaining network events. The flagged network event 513a is made up of a proportion of the data received from datasets 505 and 507.

As outlined above destination dataset may comprise data A. However, alternatively, data A may not have reached destination dataset 501, as flagged network event 513a has been flagged, dataset 501 is given the value of the data in the flagged network event 513a for the purpose of returning the data.

Destination dataset 501 is considered to receive data A associated with the network security threat from flagged dataset 513a. This may be because first dataset 503, despite receiving A +½A only sends on A in flagged network event 113a. The other data ½A has been transferred from the first dataset 503 such that its location cannot be determined. Thus, there is only the data A that can be returned to the data sources 505 and 507.

The steps of returning data associated with the network security threat will now be described. Destination dataset 501 currently comprises said data. As there is only one network event 513a between dataset 501 and intermediate dataset 503 in the network 500 shown in FIG. 5, all of the data A can be returned to intermediate dataset 503.

Once the data has been returned to intermediate first dataset 503 it is then determined what network events originally contributed to the data arriving at the first dataset 503 after the network security threat. These will have been determined when determining the network according to method 200. At intermediate dataset 503 there are two network events 513b and 513c that originally contributed to the data associated with the network security threat being present at the intermediate dataset 503. It is then determined what contribution each of the network events 513b and 513c made to the data associated with the network security event that was originally received at the intermediate dataset 503.

The data associated with the network security threat is then returned to data sources 505 and 507 based on the percentage contribution originally taken from each of the data sources 505 and 507. As can be seen in FIG. 5, originally data source 505 sent data A to dataset 503, and data source 507 sent data ½A. As only data A has been returned to dataset 503, only data ½A is returned to dataset 505 through 515b, and only data ½A is returned to dataset 507 through 515c.

At each and every dataset in the path between the destination dataset and the source datasets if it is determined that more than one network event led to the data obtained without authorisation being present at that dataset the contribution of each of these network events is determined. The data obtained without authorisation is then returned based on the contribution made by each of the network events. The network events that are responsible for the data being returned are called returning network events.

In some networks there may be further splitting of the data that is being returned where a dataset is supplied with data associated with a network security threat from multiple different datasets.

Of course, no more data than originally was sent down a path can be sent back along it when returning the data to the datasets.

We will now outline the mathematical algorithm for a method of returning the data associated with the network security threat as described above in relation to FIG. 5.

The algorithm uses a directed multi-graph $G(V, E)$, where the set of nodes V denotes the datasets and the set of edges E describes the relationships between datasets. On each edge e of the graph properties of the network event on that relationship are stored, such as the time of the network event and its value.

A graph G is initialised with all nodes having zero value of data associated with them other than the dataset identified as comprising the data associated with the network security threat $v_f$ (i.e. dataset 101), which is given a data value of the value of the network event that led to the data associated with the network security threat arriving at destination dataset $v_f$ (i.e. dataset 101). Note though that no assumption is made about the availability of this data, the algorithm returns only a list of the source datasets $\{v_s; \forall_s \in S\}$ and what data is to be returned to them, given the set of network events in the graph.

From this network $C(V, E)$, the first part of the algorithm is to produce the simplified network $G'(V', E')$. The graph is initially reversed so that network events flow from the dataset $v_f$ to the source dataset $v_s$. From this network nodes and edges are removed that are not relevant to the repatriation task. To do this, paths P are identified:

$$P = \{p_{vf \to vs}; \forall_s \in S\},$$

between the dataset $v_f$ and the source datasets $v_s$. This leaves a network that only contains nodes V' and edges E' that directly link the data at the destination dataset $v_f$ and sources datasets.

Given the simplified network $G'(V', E')$, it is then traversed using a Breadth-First search starting from the destination dataset $v_f$. At each node $v_i$, $\forall_v \in V'$, if there are multiple claims to the data in that dataset then the principle as outlined in relation to FIG. 5 is applied. For example, at $v_f$ if there are three outbound edges $e_i \in E'$ with data values $t_i$, then the amount of data transferred back along $e_i$ is given by:

$$Bal(v_f) * \left[ \frac{t_i}{\sum_{j=1}^{3} t_j} \right],$$

where $Bal(v_f)$ refers to the available data at $v_f$. The term in brackets denotes the contribution of the network event value of edge $e_i$ relative to the sum of network event values out of $v_f$.

The algorithm checks to make sure that more data are not sent back along an edge e than was originally sent down it. The search along the simplified network continues until all nodes and edges have been explored, and naturally ends when the source datasets are reached. The result of the algorithm is a list of source datasets and the amount of data to be returned relative to the data originally obtained due to the network security breach.

Figure 6:
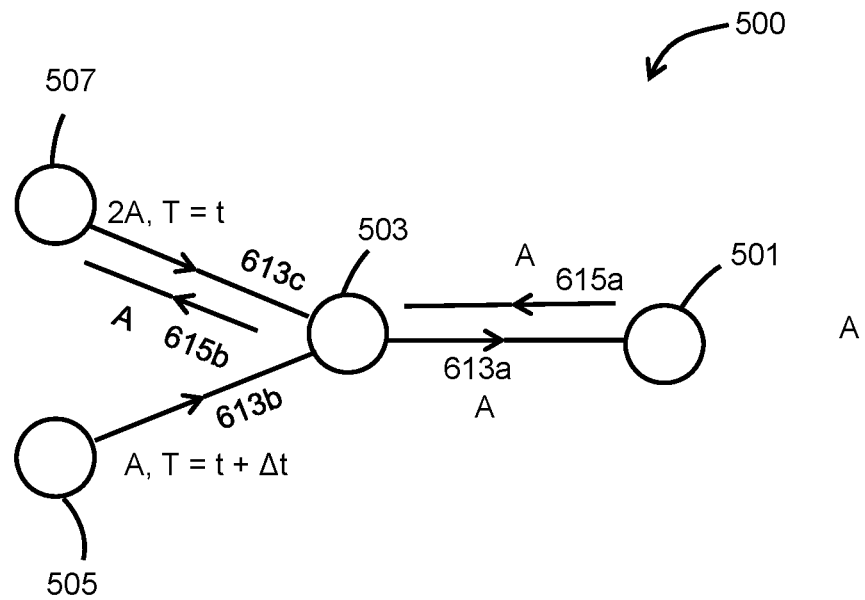
FIG. 6 is a schematic diagram of returning data to nodes of a network in accordance with an embodiment of the invention.

FIG. 6 is a schematic diagram of returning data to nodes of a network in accordance with a further embodiment of the invention. The network 500 shown in FIG. 6 is the same network as shown in FIG. 5. The network has been determined using methods 200 and 400 as outlined above.

FIG. 6 illustrates an alternative approach to that as outlined above in relation to FIG. 5 of returning data associated with a network security threat to the source dataset.

Data associated with the network security threat originates from both source dataset 505 and source dataset 507. Data 2A is obtained at intermediate first dataset 503 from source dataset 507 through network event 613c at time T=t. Data A is obtained at intermediate first dataset 503 from source dataset 509 through network event 613b at time T=t+Δt.

A portion of the data associated with the network security threat received at intermediate network first dataset 503 is then passed to destination network dataset 501 through flagged network event 613a. Network event 613a is shown as a single network event. However, in other scenarios it may be made up of more than one network event. Thus, destination dataset 501 is considered to have obtained the data A associated with the flagged network security threat 613a (despite the fact that it might not actually have reached the dataset 501 if it has been flagged before reaching the destination dataset as outlined above).

The other data 2A, that was received at dataset 503, is not transferred from first dataset 503 via flagged network event 613a, as it may be lost or transferred elsewhere, as explained above for FIG. 5.

There is only the data A to return to the datasets 505 and 507.

The process of returning the data associated with the network security threat as shown in FIG. 6 from a particular dataset is based upon the time at which the data arrived at the dataset. The flow of the data is traced backwards from the destination dataset 501 through each node to the source datasets 505 and 507. At each dataset if there is more than one network event that led to the data associated with the network security threat arriving at that dataset then the priority is given of returning data associated with the network security threat associated with the earliest network event. This principle can be through of as first in first out.

As can be seen in FIG. 6, there is only one network event 613a that led to the data arriving at the destination dataset. All of the data A is returned through 615a to the intermediate dataset 503.

At dataset 503 there are now two network events that led to the intermediate dataset receiving the data. Of the two network events, network event 613c occurred earlier (at time T=t) than network event 613b (at time T=t+Δt). Therefore, returning data associated with network event 613c takes preference over network event 613b. As network event 613c originally sent data 2A, all of the data A that is at intermediate dataset 503 is returned via 615b to source dataset 507.

In the above described case after returning data A via 615b to source dataset 507 there is no further data at intermediate dataset 503. Thus, no data is returned to dataset 505.

As will be understood, in other scenarios where data to be returned is present at intermediate dataset 503 after returning data through 615b, data will be returned to data source 505 as this is the next oldest network event.

We will now outline the mathematical algorithm for a method of returning the data associated with the network security threat as described above in relation to FIG. 6.

The algorithm uses a directed multi-graph (V, E), where the set of nodes V denotes the datasets and the set of edges E describes the relationships between datasets. On each edge e of the graph properties of the network event on that relationship are stored, such as the time of the network event and its value.

The initial state is a graph G initialised with all nodes having zero value of data associated with them other than the destination dataset $v_f$, which is given a value equal to the value of the network event leading to the destination dataset. Note though that no assumption is made about the actual availability of this value (i.e. what the value of the dataset at the present time), the algorithm returns only a list of the source datasets $\{v_s; \forall_s \in S\}$ and what data is to be returned to them, given the set of network events in the graph.

All paths P between the set of source datasets $\{v_s; \forall_s \in S\}$ and the destination dataset $v_f$ are identified. A path constitutes a set of edges that join the two datasets in the graph. We define the path $p_{vs \to vf, t}$; as being the path between the destination dataset $v_f$ and the source dataset $v_s$ and the value of t describes the path's order in time. P is then written as $$P = \{p_{vs \to vf, t}; \forall_s \in S \text{ and } t=0, \ldots, n\},$$

where n is the number of network security threats in the network. The paths are ordered in time according to the outbound network event from the source $v_s$ such that $p_{vs \to v, t=0}$ occurred earlier than $p_{vs \to vf, t=1}$. The paths are identified using a modified depth-first search.

If we denote $p_0$ as the earliest path between $v_f$ and a source $v_s$, then data are moved back starting from $v_f$, at each dataset v it is checked that the value being transferred back does not exceed the maximum of the original network event. Once $p_0$ has been traversed, the algorithm will check if there are any data from the destination dataset still available and if so continue with $p_1$ and so on. The algorithm's natural stopping point is when all path P have been traversed or the value of $v_f$=0.

The methods outlined in FIGS. 5 and 6 demonstrate how the data may be sent back to source datasets. However, these steps of sending data may not actually be carried out. Instead, the path that the data takes and the value of data sent when returning the data to the data source may instead be identified. This information may then be put into a forensic report. This may be the same forensic report as identified in methods 200 and 400. The forensic report therefore details the network 100 and/or 300 and values of data to be returned to the sources and the path through which the data takes.

The above described steps determine how the data associated with the network security threat is to be returned to the source data. However, the amount of data that is to be returned to the source dataset from which it was taken may not be the maximum that could potentially be returned.

Figure 9:
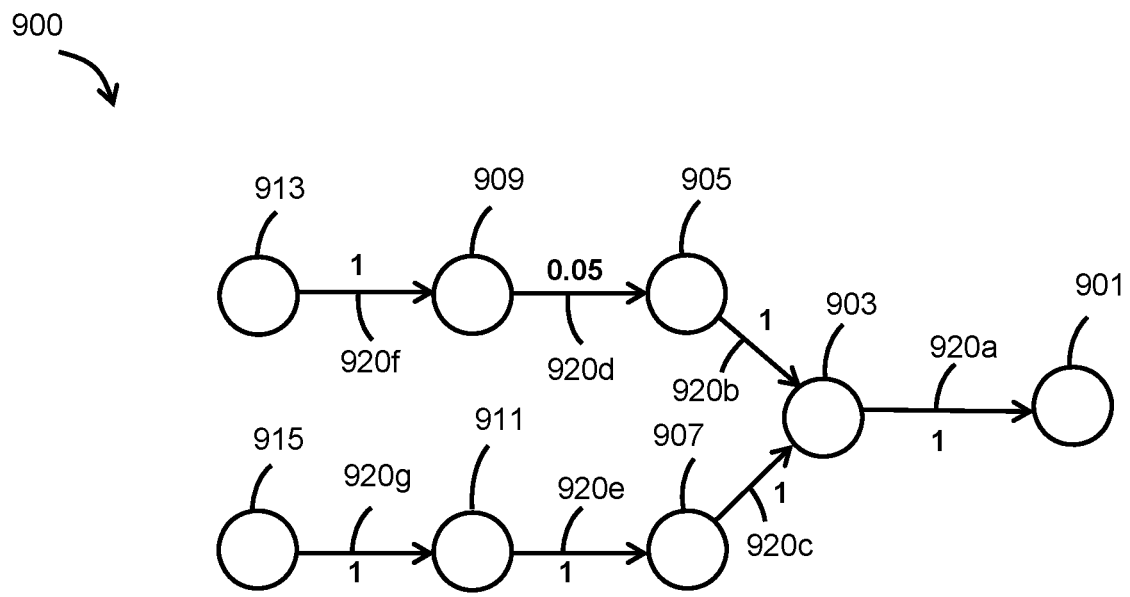
FIG. 9 is a schematic diagram of a network in accordance with an embodiment of the invention showing the flow of data associated with a network security threat from the source dataset towards the destination dataset.

FIG. 9 shows a network 900 in which a network security threat has occurred. The network 900 may have been determined using the methods 200 and/or 400 as described above and in FIG. 1 to 4. The network 900 shown in FIG. 9 shows the flow of data associated with the network security threat through the network when the data has been illegitimately obtained.

Network 900 includes source datasets 913 and 915. Source datasets are the datasets from which the data has been illegitimately taken. Network 900 includes destination dataset 901, the destination dataset 901 currently comprises the data illegitimately obtained. First dataset 903 is also shown.

Intermediate datasets 909, and 905 are on the path that the data has taken between source dataset 913 and first dataset 903. Intermediate datasets 911, and 917 are on the path that the data has taken between source dataset 915 and first dataset 903.

Network events 920 involve the transfer of the data associated with the network security threat between neighbouring nodes on its route between the source datasets 913 and 915 and the destination dataset 901. These network events 920 are obtaining network events, as they involve the transfer of data from the source datasets 913 and 915 from which it originated towards the destination dataset 901 during the network security threat.

In reference to FIG. 9 we will now describe the flow of the data associated from the network security threat from the source datasets 913 915 towards the destination dataset 901.

Starting from source dataset 913 network event 920f involves the transfer of data having a value 1 to intermediate dataset 909.

Intermediate dataset 909 then sends a portion of the data it has received from source dataset 913 through network event 920d to intermediate dataset 905. Network event 920d involves the transfer of data having a value of 0.05 to intermediate dataset 905. This data having a value of 0.05 is only 5% of the data that was originally received at intermediate dataset 909. In this case the additional data may be lost at dataset 909. For instance, it may have been sent to a different node that has not been identified, or it may no longer exist.

Intermediate dataset 905 then sends data having a value of 1 to first dataset 903 through network event 920*b*. This data sent in network event 920*b* has a higher value that the data originally received at dataset 905. This may be because data associated with a network security threat may have been received at dataset 905 from a dataset that has not been identified from methods 200 and/or 400 used to determine network 900.

Intermediate first dataset 903 then attempts to sends data having a value of 1 to destination dataset 901 through flagged network event 920*a*. In the diagram shown in FIG. 9 the attempt to send the data to the destination dataset 901 in flagged network event 920*a* results in the data arriving at the destination dataset 901. However, alternatively, this data may not have reached destination dataset 901.

Looking at the flow of data from source account 915 to destination dataset 901. Starting from source dataset 915 network event 920*g* involves the transfer of data 1 to intermediate dataset 911.

Intermediate dataset 911 then sends a portion of the data it has received from source dataset 915 through network event 920*e* to intermediate dataset 907. Network event 920*e* involves the transfer of 1 data to intermediate dataset 907.

Intermediate dataset 907 then sends 1 of data to first dataset 903 through network event 920*c*.

Intermediate first dataset 903 then sends 1 data to first dataset 901 through flagged network event 920*a*, as described above. This network event 920*a* is the combination of the flow of data from source dataset 913 and source dataset 915.

Figure 10:
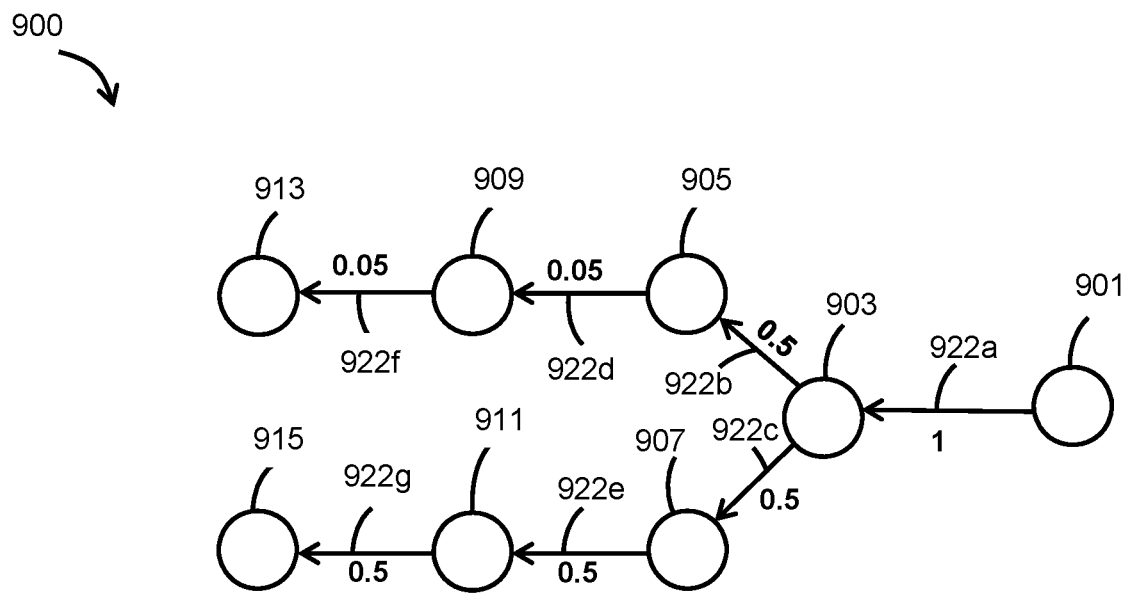
FIG. 10 is a schematic diagram of a network showing one possible flow of data to return the data associated with a network security threat to the source datasets.
Figure 11:
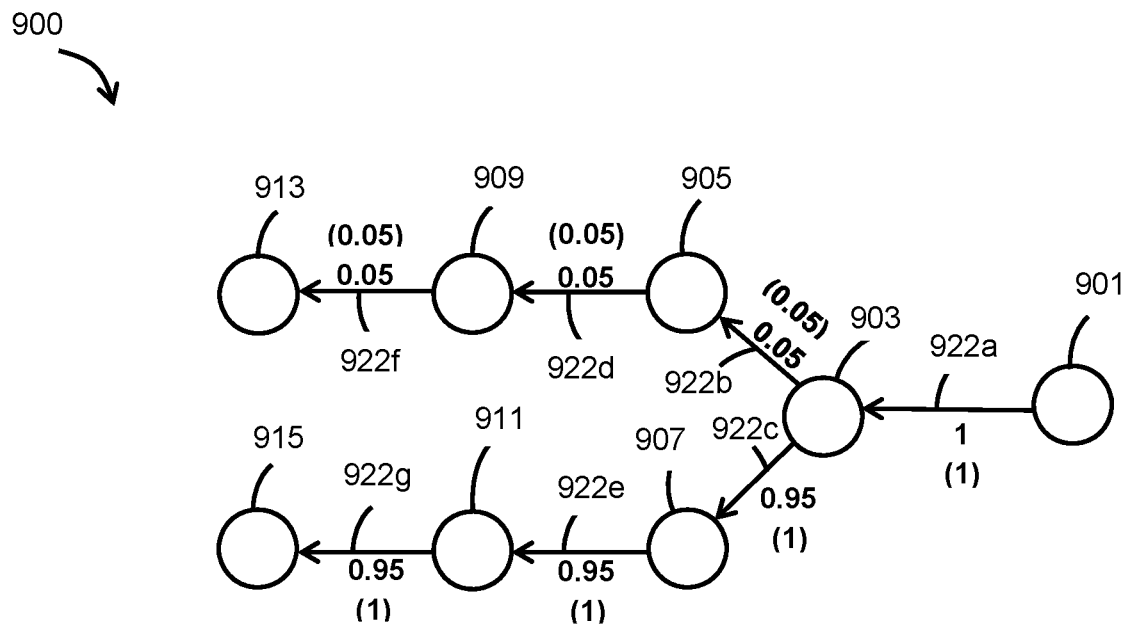
FIG. 11 is a schematic diagram of a network in accordance with an embodiment of the invention showing the flow of data to return the data associated with a network security threat to the source datasets.

The flow of data from source dataset 913 to destination dataset 901 through intermediate datasets 909, 905 and 903 is considered a path of the data. The path comprises both originating network events 920*f*, 920*d*, 920*b* and 920*a* and returning network events 922*f*, 922*d*, 922*b* and 922*a* (as discussed in relation to and as shown in FIGS. 10 and 11).

The flow of data from source dataset 915 to destination dataset 901 through intermediate datasets 915, 911 and 907 is considered a path of the data. The path comprises both originating network events 920*g*, 920*e*, 920*c* and 920*a* and returning network events 922*g*, 922*e*, 922*c* and 922*a* (as shown in FIGS. 10 and 11).

Each path goes between the destination dataset and a source dataset.

As described previously, it is desirable to determine how to return the data associated with the network security threat or a portion thereof from the destination dataset 901 to the source datasets 913 and 915.

This may be considered to be reconstructing the dataset after the security threat has occurred. It is the aim to return as much of the data that has been illegitimately obtained as possible to the source datasets, thereby reconstructing the dataset.

FIG. 10 demonstrates one way in which this might be done and the problems associated with this approach of returning data.

The network 900 shown in FIG. 10 is the same network as shown in FIG. 9. However, rather than showing the originating network events 920 the returning network events 922 are shown. The returning network events 922 are the network events responsible for returning the data associated with the network security threat to each of the source datasets. Each originating network event has a corresponding returning network event associated with it. For instance, originating network event 920*a* between destination dataset 901 and intermediate dataset 903 has a corresponding returning network event 922*a* between destination dataset 901 and intermediate dataset 903. The value of the data sent in the originating network event may be different to the returning network event. However, the value of the data in the returning network event may never be greater that the value of the data in the originating network event. In this way, it ensures that no more data is returned to a dataset than was originally obtained during the network security threat from that dataset. The returning network event is in the reverse, or opposite, direction to the obtaining network event.

The value of data to be returned via each returning network event as shown in FIG. 10 may be determined using the method as described in FIG. 5 previously. At dataset 903 it is determined the value of data that should be sent to each of datasets 905 and 907. As can be seen in FIG. 10 and FIG. 9 as both network events 920*b* and 920*c* involved originally sending the same amount of data to network node 903, it is determined that the data should be split equally when determining how much of the data at dataset 903 should be sent to datasets 905 and 907 via returning network events 922*b* and 922*c*. As can be seen in FIG. 10, as only 1 data is available at dataset 903, 0.5 data is sent via network event 922*b* to dataset 905 and 0.5 data is sent via network event 922*c* to dataset 907.

As can be seen in FIG. 10 the data having a value of 0.5 received at dataset 907 is returned to source dataset 915 through returning network events 922*e* and 922*g*. This is because the returning data with a value of 0.5 is not greater than the value of data originally transmitted in the originating network events 920*e* and 920*g*.

However, of the 0.5 data received at dataset 905 from dataset 903 only 0.05 can be sent in returning network event 922*d* to dataset 909. This is because the corresponding original network event 920*d* only sent 0.05 data. Dataset 909 can then only return the 0.05 of data that it received through network event 922*f* to data source 913, as it only has 0.05 available to send back.

The strategy of returning data as shown in FIG. 10 has the disadvantage that some of the data that is available to send back does not make it to the source datasets. The amount of data that can be sent to source dataset 913 is limited to 0.05, owing to the originating network event 920*d* limiting the value that can be sent to 0.05.

However, source dataset 915 would have been able to receive a greater amount of data than shown in FIG. 10, as each of the returning network events 922*c*, 922*e*, 922*g* have available capacity to send more data to source dataset 915. This is because each of the obtaining network events in this path sent data with a value greater than 0.5 Therefore, the data that cannot be sent to source dataset 913 could have been sent to source dataset 915 if the loss of the data at dataset 905 could have been predicted. As shown in FIG. 10 source dataset 915 does not receive the full amount of data back that was originally lost in the network security threat in originating network event 920*g*.

This loss of data may occur where an obtaining network event having a certain value is located between two obtaining network events having a higher value. As shown in FIG. 10 this is obtaining network event 920*d*, which is between obtaining network events 920*f* and 920*b*.

The present disclosure provides a method of determining the data to be returned to each source dataset such that a greater proportion of the data can be returned to that as shown in FIG. 10.

FIG. 11 shows network 900 and the returning network events, as shown in FIG. 10. However, in FIG. 11 the following method has been implemented that determines the data to be returned to each source dataset such that a greater proportion of the data can be returned than by implementing the method as shown in FIG. 10.

As can be seen in FIG. 11 only 0.05 data is sent in returning network event 922b. Whereas 0.95 of data is sent via returning network event 922c. As can be seen from FIG. 11 all of the 0.05 of data can be returned to source dataset 913. In addition, all of the 0.95 of data can be returned to dataset 915. Thus, the source dataset 913 in FIG. 11 receives the same 0.05 as received when implementing the method of returning the data as shown in FIG. 10. However, the data returned to dataset 915 shown in FIG. 11 is 0.95 which is greater than the value of data returned to source dataset 915 in FIG. 10. The returning of data as per FIG. 11 results in more of the data associated with the network security threat being returned to the source datasets.

The method applied in FIG. 11 that results in an improved determination of how to return the data will now be described.

Firstly, details of the network associated with the network security threat are determined. This allows the determination of the arrangement of network 900 as shown in FIGS. 9 and 11. This may be determined using methods 200 and/or 400 as described above in relation to FIGS. 1 to 4.

A plurality of paths through which the data associated with the network security threat has passed between the one or more source datasets and the destination dataset is determined. The plurality of paths are as described above. For FIG. 9 this will be the first path 913 to 901 via 909, 905, and 903, and second path 915 to 901 via 911, 907, and 903, as outlined above.

A maximum flow is then determined for returning the data associated with the network security threat to the one or more source datasets via each of the plurality of paths. The maximum flow is the maximum amount of data that can be sent through each returning network event.

The maximum flow may be determined in various ways. Initially a theoretical capacity for each of the returning network events is determined. This is determined for each of the paths.

For instance, the theoretical capacity may be set such that the value of the returning network event is equal to the value of the data sent in its associated obtaining network event. For instance, taking the returning network event 922e in FIG. 11, the theoretical capacity for returning network event 922e is 1 as originating network event 920e was involved in sending 1 to dataset 907. For returning network event 922d, its theoretical capacity is 0.05 as this was the value that was sent in obtaining network event 920d.

Alternatively, other criteria may affect the theoretical capacity for each of the returning network events, not just the value of the data sent in the obtaining network event. For instance, some network events may only be able to send a certain amount of data.

Once the theoretical capacity for each of the returning network events has been determined for a first of the paths a maximum flow for all of the returning network events of the first path is determined. The maximum flow is equal to the lowest determined theoretical capacity of the returning network events in the first path, such that the same maximum flow applies to all of the returning network events of the first path.

In network 900 the maximum flow for path between dataset 913, 909, 905, 903 and 901 is determined. The maximum flow of this path is determined to be 0.05 as the lowest determined theoretical capacity in this path is 0.05. This maximum flow is initially applied to each of the returning network events in the first path. Returning network events 922f, 922d, 922b and 922a are determined to initially have a maximum flow of 0.05.

The step of determining the maximum flow is then applied to each of the other paths in the network. Thus, the above described steps are applied to each path.

In the network 900 the maximum flow is then determined for the path 915, 911, 907, 903, to 901. In the present case the maximum flow is determined to be 1 as the lowest determined theoretical capacity in this path is 1.

When determining the maximum flow, if a returning network event is associated with multiple paths the maximum flow of that particular returning network event is updated. In this way the returning network events associated with multiple paths may have a different maximum flow than the maximum flow for the path as determined above. This is because these returning network events contribute data to multiple paths rather than a single path, so consideration of each of the paths is required.

If one or more returning network events are associated with multiple paths the maximum flow of these particular returning network events is updated to be the smaller of: the determined theoretical capacity of the returning network events associated with multiple paths that has the lowest value, or a sum of the lowest determined theoretical capacity of the returning network events in each of the paths that the one or more returning network events are associated with.

By taking into account the sum of the lowest determined theoretical capacity of the returning network events in each of the paths that the one or more returning network events are associated with, it takes into account the maximum flow capacity for each of the paths that has previously been determined. It is the sum of each of these maximum flow capacities for each of the paths that has already been determined.

However, it also takes into account the determined theoretical capacity of the returning network events associated with multiple paths that has the lowest value. This is because each of the returning network events that are associated with multiple paths will have their own theoretical capacity. For instance, in some instances the theoretical capacity may not exceed the value of data sent in the associated obtaining network event. Therefore, if the summation mentioned above exceeds the value of any of the theoretical capacities of the returning network events associated with the multiple paths the maximum flow of the network events associated with the multiple paths is set to the lowest theoretical capacity of the network events in the multiple paths.

In the network 900, it can be seen that network event 922a is associated with multiple paths. It is associated with path 913, 909, 905, 903 to 901 and path 915, 911, 907, 903 to 901.

The determined theoretical capacity of returning network event 922a that is associated with multiple paths is 1. This is because corresponding originating network event 920a has a value of 1.

Although in network 900 only one returning network event is associated with multiple paths, if a further network event was associated with multiple paths it would need to be determined which of the returning network events has the lowest theoretical capacity. The lowest theoretical capacity would then be used to determine which one is the lowest to apply to all of the network events associated with the multiple paths.

The sum of the lowest determined theoretical capacity of the returning network events in each of the paths that the one or more returning network events are associated with for network 900 is 1.05. This can otherwise be considered to be the sum of the maximum flow of each of the multiple paths the network event is associated with. In the network 900 path 913, 919, 905, 903, to 901 has a maximum flow of 0.05 that has been determined above. In the network 900 path 915, 911, 907, 903, to 901 has a maximum flow of 1 that has been determined above. This leads to the value of 1.05 after the summation is applied.

As the determined theoretical capacity of returning network event 922a that is associated with multiple paths is less that the summation (1 compared to 1.05) then the maximum flow for returning network event 922a is updated to have a value of 1.

Based on the above method, the maximum flow of each of the returning network events are as shown in brackets in FIG. 11. These indicate the maximum flow for the network. The returning network events in the portions of the paths that are associated with only a single path have the same maximum flow. The returning network events associated with multiple paths may have a different maximum flow to the rest of the paths they are associated with.

In the network 900 the returning network event 922a has a value of 1. This could have been 1.05 (the sum of the maximum flow of both paths it is associated with). However, it is limited by the value of its asserted originating network event 920a which has a value of 1.

A further method of determining the maximum flow may involve implementing an Edmonds-Karp algorithm. The Edmonds-Karp algorithm is a known method for computing a maximum flow in a network. This may implement some, all, or none of the steps described above related to the calculation of the maximum flow.

When carrying out the determination of the maximum flow certain methods for calculating the maximum flow may not work when the network has multiple source accounts. It may be necessary for some networks to have a single source account and a single destination account (e.g. single source and sink).

When the network comprises a plurality of source datasets the method may comprise: before determining the maximum flow: generating a dummy dataset and dummy network events flowing between the dummy dataset and each of the source datasets, and after determining the maximum flow: removing the dummy dataset and dummy network events before the step of determining the data to be transferred to each dataset such that the data can be returned to the one or more source datasets.

As can be seen in FIG. 11, network 900 has two source datasets. Therefore, it may be desired to introduce a dummy dataset, with dummy network events, such that the network 900 has a single source. This may make the calculation of the maximum flow easier for certain methods. This artificial dataset is not an actual dataset and the dummy network events are also an artificial creation. Advantageously, it enables methods of determining the maximum flow to be applied to networks that it would not normally be possible to apply them to.

Generating a dummy dataset when there is more than one source dataset may be required when applying the Edmonds-Karp algorithm, as this algorithm requires a single source and sink. It may also be applicable for other methods of determining the maximum flow.

Figure 12:
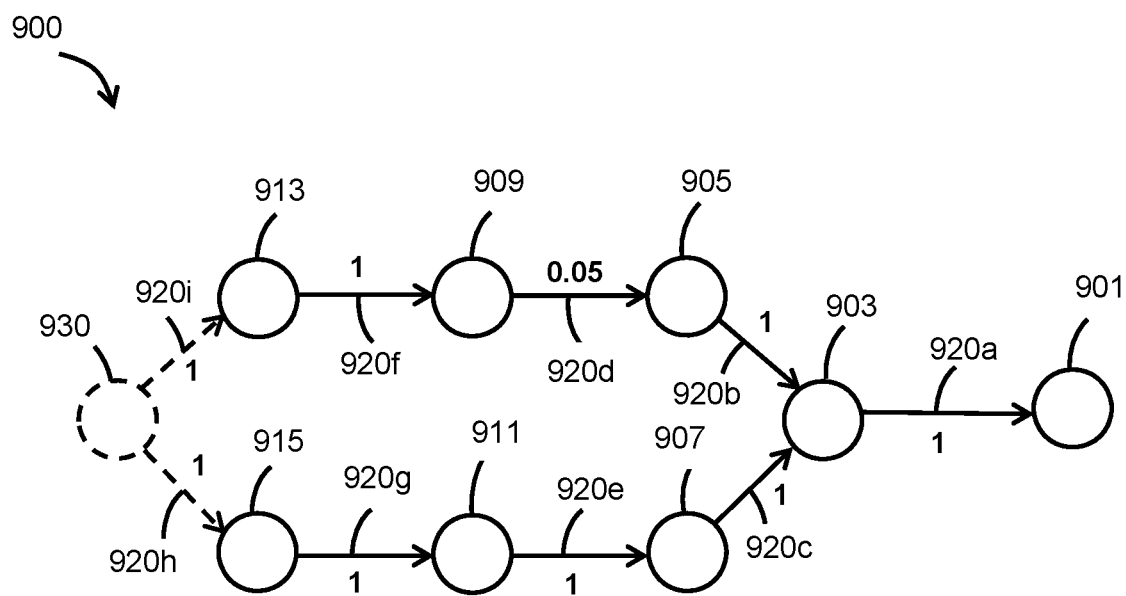
FIG. 12 is a schematic diagram of a network in accordance with an embodiment of the invention showing the flow of data to return the data associated with a network security threat to the source datasets.

FIG. 12 shows the network 900 where a dummy dataset 930 has been generated. Dummy originating network events 920i and 920h are also shown. Dummy network event 920h is between source dataset 915 and dummy dataset 930. Dummy network event 920i is between source dataset 913 and dummy dataset 930. In this way, the network can be considered to have only a single source account.

The value of the data sent in dummy originating network events 920i and 920h is equal to the value of the data originally obtained from the source datasets 913 and 915. In dummy network event 920h data of value 1 is sent to dataset 915, this is the same as the data sent in originating network event 920g. In dummy network event 920i data of value 1 is sent to dataset 913, this is the same as the data sent in originating network event 920f. The purpose of dummy network events and dummy datasets is to allow methods to be applied to networks to which it would not normally be possible.

Advantageously, the maximum flow provides an upper limit on the amount of data associated with the network security threat that can be returned via the returning network events. It also results in the possibility of a greater amount of data being returned to the source datasets from which it originated. It enables knowledge of all of the network events and datasets, to ensure that data will not be sent down a particular path through which it cannot reach the source dataset, when it could have instead have been sent to a source dataset via an alternative path. This results in a greater proportion of the data being returned to the source dataset.

Once the maximum flow has been determined, it is then determined how the data associated with the network security threat is to be returned to the one or more source datasets.

This involves starting from the destination dataset, determining the data to be transferred to each dataset in the plurality of paths between the destination dataset and the one or more source datasets such that the data can be returned to the one or more source datasets, the data transferred in each path not exceeding the determined maximum flow for the path, and adding the details of the determined amount of data to be transferred to a forensic report.

In this way, it is determined how the data is to be returned to the one or more source datasets. The amount to be returned is based on the maximum flow which has been determined as described above. The amount to be returned via a path through each returning network event should not exceed the maximum flow of the returning network event.

The step of determining the data to be transferred to each dataset in the plurality of paths between the destination dataset and the one or more source datasets may be carried out in a number of ways.

One way of determining the data to be transferred to each dataset in the plurality of paths between the destination dataset and the one or more source datasets may involve the following. Starting from the destination dataset, determining the value of data to transfer through each returning network event between the destination dataset and its neighbouring intermediate datasets, the determining based on the value of the data available at the destination network dataset and the maximum flow for the path the returning network event is associated with.

As shown in FIGS. 9 and 11 for network 900, starting from destination dataset 901 it is determined that data having a value of 1 can be transferred through returning network event 922a to dataset 903. This is because destination dataset 901 only has 1 data and the maximum flow (as calculated as discussed above) for network event 922a is 1.

In this case the amount of data transferred in returning network event 922a is the maximum amount that could be transmitted, regardless of the data available at destination dataset 901 as the maximum flow of network event 922a is 1.

Then starting from each of the destination dataset's neighbouring intermediate datasets, the value of data to transfer through each returning network event between this dataset and its neighbouring intermediate datasets is determined, the determining based on the value of the data that has been determined to be transferred to this dataset and the maximum flow for the path the returning network event is associated with. This is then repeated for each of the intermediate datasets along each of the paths, until it is determined how the data is to be returned to the one or more source datasets.

Thus, the value of data to transfer through each of the returning network events is determined at all of the intermediate nodes in the path starting from the destination dataset to the source datasets. At each dataset it is determined the value of data that has been sent to it from the preceding dataset in the path, i.e. through the returning network event arriving at said dataset. The value of data to transfer through the returning network event from that dataset towards the source dataset is based on the value received at that dataset and the maximum flow of the returning network event.

For instance, in reference to network 900 in FIG. 11, data 1 has been sent in network event 922a to intermediate dataset 903. Dataset 903 has data 1 available that has been received through network event 922a. From dataset 903 it is then determined the value of data to be transmitted through each of the returning network events 922b and 922c, which are each related to separate paths. This is carried out based on the data available at dataset 903 and the maximum flow for each of the returning network events 922b and 922c. This is then repeated at the next intermediate datasets in the network in each of the paths: datasets 909 and 911. This is repeated until the data sources 913 and 915 are arrived at.

The tracing through the network to determine the data to be transferred to each dataset in the plurality of paths between the destination dataset and the one or more source datasets may be carried out using a Breadth first search algorithm. The Breadth first search algorithm may result in the determination to be carried out along each of the paths starting from the lowest order dataset (i.e. being closest to the destination dataset) and carrying out the determination at these datasets, before progressing to the next order datasets. This is as described above, i.e. progressing from first looking at 905 and 907, to then looking at 909 and 911.

However, it may be understood the determination of the data to be transferred may be carried out for one path, before progressing to the next path. For instance, the determination may be carried out at 905, 909 to arrive at 913 first, with the determination carried out at 907, 911 to arrive at 915 afterwards.

At each dataset where there is more than one returning network event it is necessary to determine what the split of data should be between the multiple returning network events. This may be carried out by: summing the value of the data originally sent to the dataset in each of the obtaining network events associated with that dataset; determining a percentage contribution of data each obtaining network event made to the summed total; determining the amount of data to be transferred via each of the returned network events by multiplying the contribution of its associated obtaining network event by the available value of data at the dataset, and where this exceeds the maximum flow for that returning network event setting the amount of data to be transferred to be equal to the maximum flow.

Where the maximum flow would be exceeded and the amount of data to be transferred is set to be the maximum flow, the method may involve sending the proportion of the data that exceeds the maximum flow via one of the other returned network events. In this way, data that cannot be sent via one path may be sent to a source dataset via another path.

This is now explained in relation to dataset 903 in FIG. 11 which has two returning network events 922b and 922c. It is necessary to determine what proportion of data is to be sent via network event 922b and 922c.

Two obtaining network events 920b and 920c led to the data associated with the network security threat originally arriving at dataset 903. The sum of the value of data in these originating network security threats is 2 as can be seen from FIG. 9 (1 from 920b and 1 from 920c). For each of these originating network events the contribution made by each of them to the amount received at dataset 903 in the obtaining network events is determined to be: 1+2=50%. In other words both obtaining network events provide the same contribution to the total amount of data originally received at dataset 103.

The amount of data to be returned via each of the returning network events is then determined. This involves multiplying the contribution made by its corresponding obtaining network event (50% in the case of network events 922b and 922c) by the value of the data at the dataset. At dataset 903 the available value of data at the dataset is 1 as it has been determined that 1 will be returned through returning network event 922a. This would have led to 50% of the data being sent via network event 922b and 50% sent via network event 922c. This would be the same as in FIG. 9. However, in the present method the maximum flow for the returning network event is used such that the data to be transferred via each returning network event cannot exceed the maximum flow for that returning network event.

As returning network event 922b has a maximum flow of 0.05 only 0.05 of data can be sent via network event 922b. The remaining data will then be split based on the contribution made by each of the other network events, whilst ensuring that the maximum flow for those network events is not exceed. In the case where there are more than two returning network events from a single dataset the data that has not been sent through network event 922b will be sent through the other returning network events based on their contribution ensuring that their maximum flow is not exceeded.

In the present case as there is only one other network event 922c. As network event 922c has a maximum flow of 1 the remaining data can be determined to be sent via network event 922c such that 0.95 is sent via network event 922c.

As the maximum flow has been taken into account, all of the 0.05 sent via network event 992b is eventually received at source dataset 913, and all of the 0.95 sent via network event 922c is received at source dataset 915.

In comparison to the method of returning the data associated with the network security threat shown in FIG. 9 a greater proportion of data is returned to the source accounts. By taking into account of the maximum flow the source dataset 915 has received 0.95 in FIG. 11 compared to only 0.5 in FIG. 9. Whilst the amount of data received at source dataset 913 is 0.05 in both cases. Therefore, there is a higher rate of returning data to the source datasets, with less data that has not been allocated to a source dataset. This can be thought of as a modified version of the method as set out above in relation to FIG. 5.

In other arrangements of networks, other datasets may have multiple returning network events sending data away from them. For instance, this could be any intermediate dataset or the destination dataset. The available value of data at the dataset is the determined value for intermediate datasets. For the destination dataset the available value will be the data actually available at the destination dataset.

Once it has been determined what data is to be transferred to each dataset the forensic report is output. The forensic report includes the details of the determined amount of data to be transferred to the source dataset. The forensic report may also include details of each dataset, the returning network events and the associated values of the data that has been determined to be transmitted via each of these network events. Alternatively, it may only provide a list of the source datasets and what they are owed based on the determination using the methods described above. The forensic report may in some cases also provide the map of the network.

The method described above implies that the destination dataset comprises the data associated with the network security threat. In other words, that the flagged network event 920a has led to the data being sent to the destination dataset. However, the flagged network event may have been flagged in a way that the data has not actually reached the destination dataset. However, for the purpose of the methods above the value of the data in the flagged network event is assigned to the destination account when carrying out the above methods to determine the data to be transferred to each dataset.

The method as described above relates to the determination of how data should be returned to the source datasets. The additional step of returning the data as determined in the method above may also be implemented.

In some instances, the forensic report is automatically processed by a data processing device on which the method is being run on. In this way, the data processing device may automatically return the data.

Figure 13:
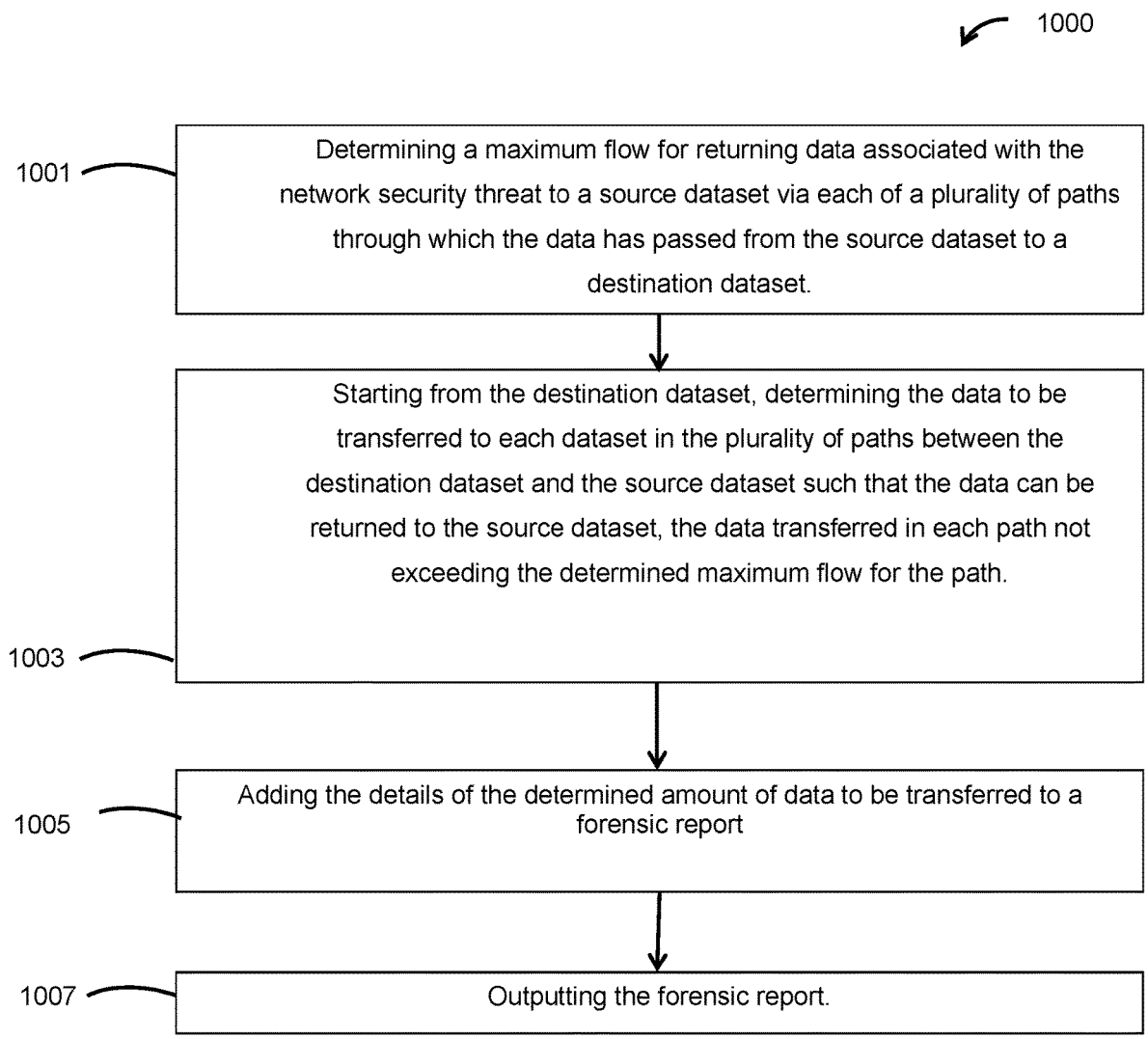
FIG. 13 is a flow chart setting out a method in accordance with an embodiment of the invention.

FIG. 13 is a flow chart setting out a method 1000 in accordance with an embodiment of the invention.

Step 1001 involves determining a maximum flow for returning data associated with the network security threat to a source dataset via each of a plurality of paths through which the data has passed from the source dataset to a destination dataset.

At step 1003 the method involves starting from the destination dataset, determining the data to be transferred to each dataset in the plurality of paths between the destination dataset and the source dataset such that the data can be returned to the source dataset, the data transferred in each path not exceeding the determined maximum flow for the path.

At step 1005 the method involves adding the details of the determined amount of data to be transferred to a forensic report.

At step 1007 the forensic report is output.

We will now outline the mathematical algorithm for a method of determining the data associated with the network security threat to be returned as described above in relation to FIG. 13.

The algorithm uses a directed multi-graph (V, E), where the set of nodes V denotes the datasets and the set of edges E describe the network events between datasets. On each edge e of the graph properties of the network events on that relationship are stored, such as the time(s) of the network events(s) and value.

A graph G is initialised with all nodes having zero value of data associate with them other than the destination dataset $v_f$, which is given a value of the obtaining network event to the destination dataset. Note though that no assumption is made about the availability of this value of data, the algorithm in some cases may only return a list of the source datasets $\{v_s; \forall s \in S\}$ and what data is to be returned to them, given the set of network events in the graph.

From this network (V, E), the first part of the algorithm is to produce the simplified network G'(V', E'). The graph is initially reversed so that the returned data flows from the destination dataset $v_f$ to the source dataset $v_s$. From this network we seek to remove nodes and edges that are not relevant to the repatriation task. To do this, we identify the paths P:

$$P=\{p_{vf \to vs}; \forall s \in S\},$$

between the destination dataset $v_f$ and the source datasets $v_s$, where n is the number of security threats in the network. This leaves a network that only contains nodes V' and edges E' that directly link the data associated with the network security threat and sources datasets.

In the case where |S|>1 then a dummy node $v_d$ is introduced along with dummy edges, $E_d$, between each source dataset and the dummy node $v_d$ $$E_d=\{e_{vs \to vd} \forall s \in S\}.$$

This network G' has the Edmonds-Karp algorithm applied to it which results in a graph ($V_m$, $E_m$), where $V_m=V' \cup \{v_d\}$ and $E_m=E' \cup E_d$ are the set of nodes and edges that contain the dummy nodes and dummy network events if applicable. This graph has the edge properties adjusted such that for each edge e in the network, there will be an associated maximum value that can flow along that edge. Lastly, in the case where dummy nodes and dummy edges were inserted into the network, they are removed leaving (V', E').

The network (V', E') is then traversed using a Breadth-First Search starting from the destination dataset. At each node $v_i$, $\forall v \in V'$, if there a multiple claims to the data associated with the network security threat in that dataset then the Pari-Passu principle is applied. For example, at $v_f$, if there are 3 outbound edges $e_i \in E'$ with max_flow values $f_i$, then the sum transferred to back along $e_i$ is given by:

$$Bal(v_f) * \left[ \frac{f_i}{\sum_{j=1}^{3} f_j} \right]$$

where $Bal(v_f)$ refers to the available data at $v_f$. The term in brackets denotes the contribution of the network event of edge $e_i$ relative to the sum of network events out of $v_f$.

The algorithm checks to make sure that more data are not sent back along an edge e than was originally sent down it. The search along the simplified network continues until all nodes and edges have been explored, and naturally ends when the source datasets are reached. The result of the algorithm is a list of source datasets and the amount they are to repatriate relative to their initial loss of data.

Figure 7:
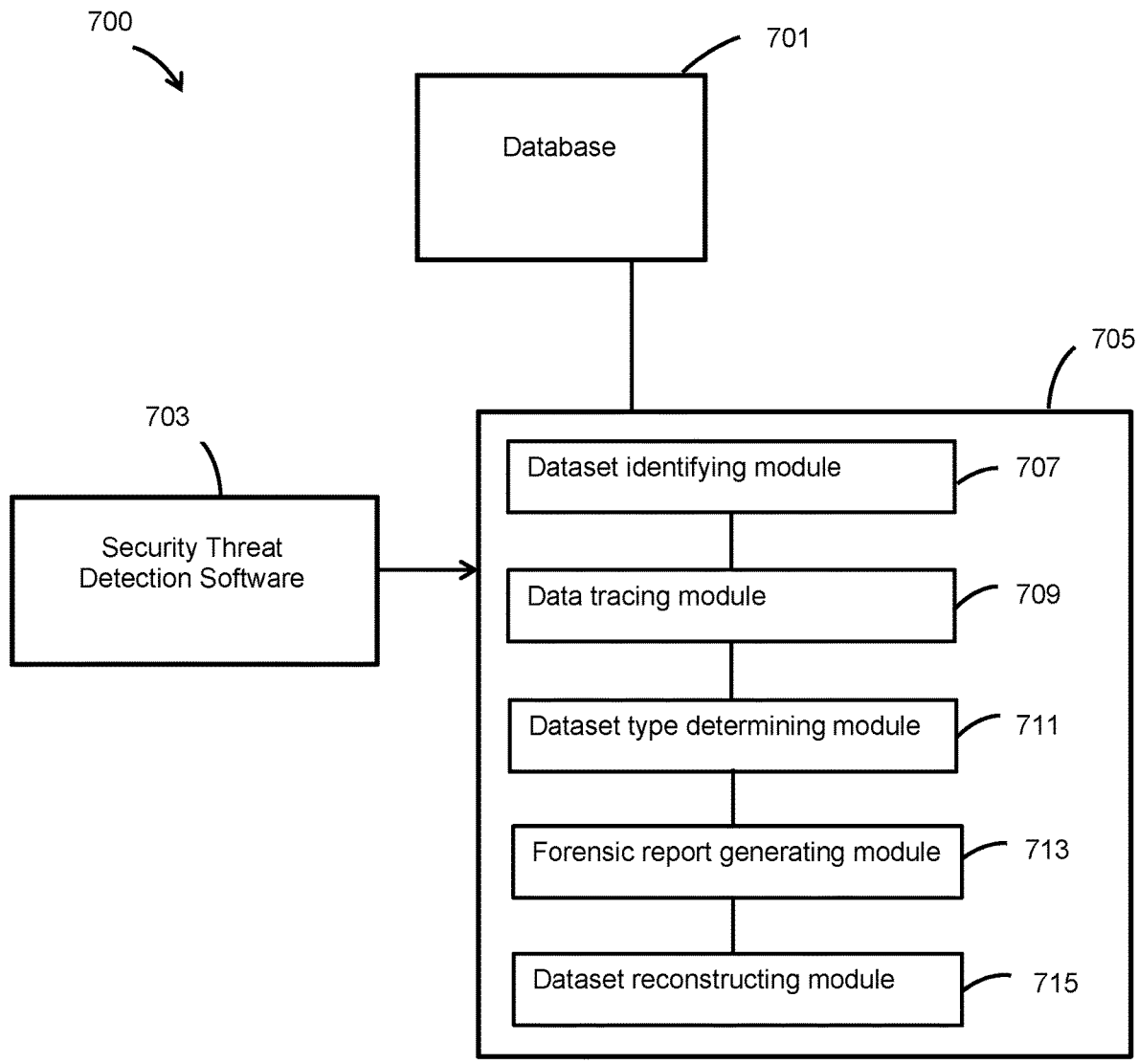
FIG. 7 is a schematic diagram of a system capable of implementing the invention and in accordance with an embodiment of the invention.

FIG. 7 is a schematic diagram of a system 700 capable of implementing the invention and in accordance with an embodiment of the invention. Data processing device 705 includes a number of modules. These include dataset identifying module 707, data tracing module 709, dataset type determining module 711, forensic report generating module 713. Each of the modules may communicate with one another. Device 705 also includes a dataset reconstructing module.

Security threat detection software 703 includes the code configured to perform the methods as described above in relation to FIGS. 1 to 6 and in FIGS. 9 to 13. Security threat detection software 703 may be executed on device 705. Each of the modules 707 to 713 may be responsible for executing a specific portion of the code.

Dataset identifying module 707 is responsible for obtaining data associated with and/or identifying the network events that comprise data associated with a network security threat.

Data tracing module 709 is responsible for tracing the data associated with the network security threat between the datasets to determine the flow of the data associated with the network security threat.

Dataset type determining module 711 is responsible for comparing details of each of the identified datasets to predefined criteria to identify if the datasets are an intermediate dataset or a source dataset.

Forensic report generating module 713 is responsible for outputting a forensic report comprising details of the determined network associated with the security threat.

Each of the modules 707 to 713 may be considered as a network detecting module. Dataset reconstructing module 715 is responsible for determining how data should be returned to the source datasets. Dataset reconstructing module 715 can perform the method of FIG. 13.

System 700 also includes database 701. The data associated with the datasets is stored in database 701. In some arrangements the data of the datasets may be stored in more than one database 701. For instance, each dataset may have its own database 701. It may also be understood that the data from each dataset may be stored across numerous databases, such that a datasets data is not stored on a single database. The data from the datasets may be stored in the database by any means that is known. For each entry stored in the dataset the data may comprise data having a certain value and a time stamp associated with the item of data.

As outlined earlier, in relation to FIG. 1, datasets 103, 107, 109, 111 and the network events between them may not be known to device 705. The execution of software 703 enables device 705 to determine this network and automatically output the forensic report.

It will be appreciated that any of the methods described herein, and any particular step of said methods, can be implemented by a computer. Such implementation may take the form of a processor executing instructions stored on a non-transitory computer-readable medium or media, wherein when executed the instructions cause the processor to perform any one or more steps of any of the methods described herein. Individual steps of a method may be implemented by different processors that are all collectively acting in accordance with computer-readable instructions stored on one or more storage media. The processor or processors may be component(s) of system 700, for example a processor of device 705.

Figure 8:
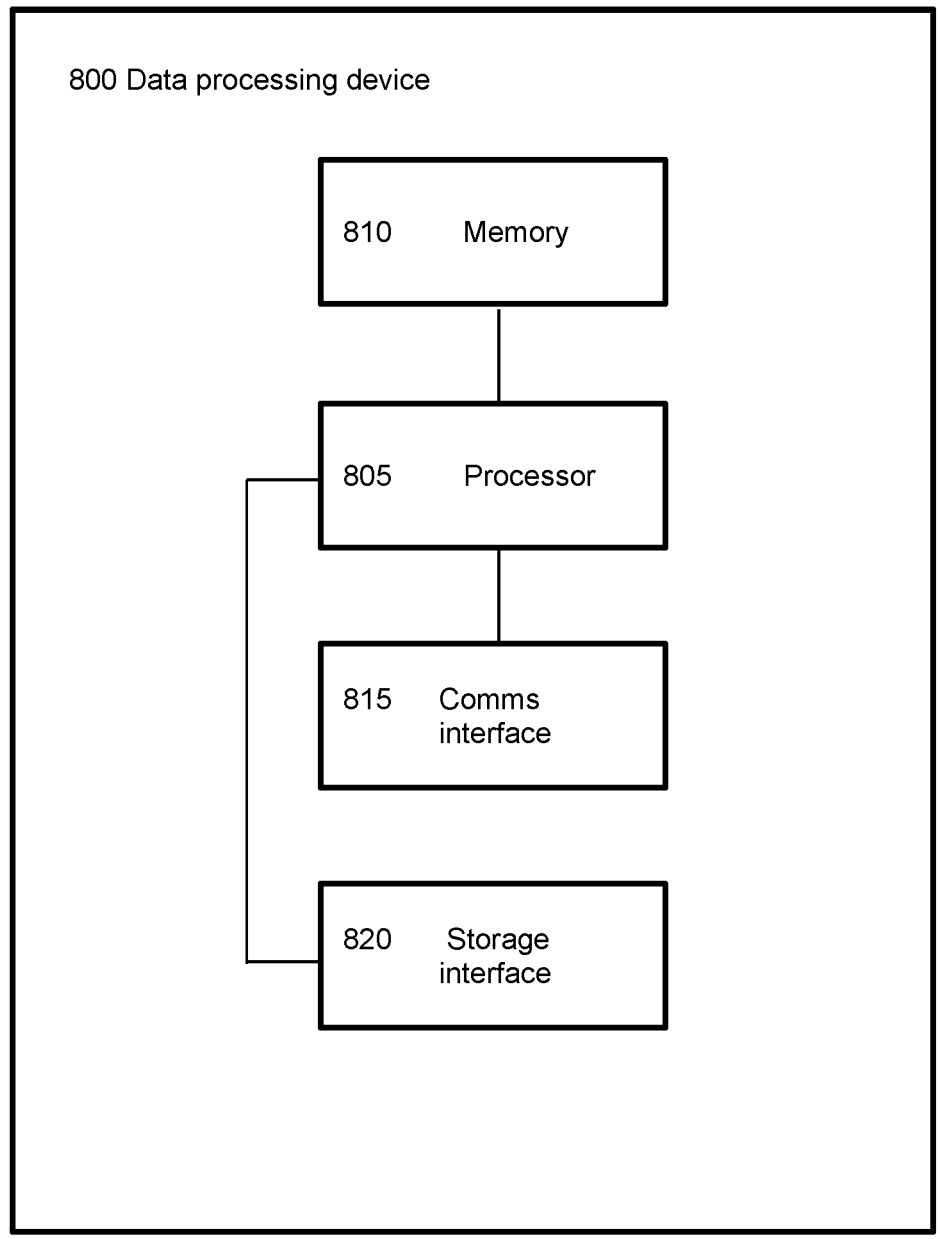
FIG. 8 shows in schematic form a data processing device that is suitable for performing the functions of any data processing device within the system shown in FIG. 1.

Equally, any steps of any of the methods described herein may be performed by data processing devices as described in respect of system 700 of FIG. 7. By way of example, FIG. 8 shows in schematic form a data processing device 800 that is suitable for performing the functions of each of the modules 707 to 713 of device 705. The data processing device 800 may automatically perform any of the methods described herein, and automatically output a forensic report.

In addition, upon the determination of a forensic report for returning the data it may involve the data processing device 800 automatically returning said data to the data sources according to the forensic report.

Data processing device 800 includes a processor 805 for executing instructions. Instructions may be stored in a memory 810, for example. Processor 805 may include one or more processing units (e.g., in a multi-core configuration) for executing instructions. The instructions may be executed within a variety of different operating systems on the data processing device 800, such as UNIX, LINUX, Microsoft Windows®, etc. More specifically, the instructions may cause various data manipulations on data stored in memory 810 (e.g., create, read, update, and delete procedures). It should also be appreciated that upon initiation of a computer-implemented method, various instructions may be executed during initialization. Some operations may be required in order to perform one or more methods described herein, while other operations may be more general and/or specific to a particular programming language (e.g., C, C#, C++, Java, or other suitable programming languages, etc.).

Processor 805 is operatively coupled to a communication interface 815 such that data processing device 800 is capable of communicating with a remote device, such as another data processing device of system 700. For example, communication interface 815 may receive communications from another member of system 700.

Processor 805 may also be operatively coupled to a storage device such as database 701, depending on the function of data processing device 800 within the context of system 100. The storage device is any computer-operated hardware suitable for storing and/or retrieving data, where in the case of a secure storage medium the data is stored and retrieved securely.

Database 701 can be external to data processing device 800 and located remotely. Alternatively, it can be integrated in data processing device 800. For example, data processing device 800 may include one or more hard disk drives as a storage device. Alternatively, where the storage device is external to data processing device 800, it can comprise multiple storage units such as hard disks or solid state disks in a redundant array of inexpensive disks (RAID) configuration. The storage device may include a storage area network (SAN) and/or a network attached storage (NAS) system.

Processor 805 can be operatively coupled to the storage device via a storage interface 820. Storage interface 820 is any component capable of providing processor 805 with access to the storage device. Storage interface 820 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 805 with access to the storage device.

Memory 810 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

As outlined above, the present method relates to a network security threat that has occurred. One example of a network security threat may be a virus on a computer system. In this scenario each dataset is a computer system.

The network is the connection between these computer systems, be it through the internet or through a wired local connection. The destination dataset is a computer system that has been identified to be intended to be infected with said virus, this may be from receiving a malicious transfer of data that has been flagged. It is then determined how the virus arrived at the infected computer system by tracing the path the virus has taken backwards from the flagged transfer of data that is intended to infect the computer system. The network events are the further acts of sending the virus between the computer systems. This might be through an email, through removable storage, the internet, or any other means known to transmit viruses. An intermediate dataset is a computer system that is responsible for passing on the virus that it has received. A source dataset is the computer system on which the virus was originally created, and/or the first computer system to become infected. Advantageously, by determining where the virus originated from the vulnerabilities in the network can be determined. It also allows determination of computer systems that may belong to or be used by criminals.

In addition, the forward tracing of the method of 400 allows determination of computer systems infected by the virus that might not be known about. For instance, these computer systems might not have the appropriate anti-virus software installed to recognise that they are infected. This may provide a method of identifying that these computer systems are infected.

A further example the network may be a financial network and the network security threat an unauthorised modification of routing information within the financial network. For instance, it may be a fraud in a financial system. The data associated with a network security threat may be a fraudulent transaction, where money has been taken from an account without authorisation. The datasets may be bank accounts. The destination dataset is a bank account that has been frozen which has been determined to have been sent funds relating to the fraudulent transaction or to be receiving them through the network event 113a. The flagged network event may be a frozen transaction containing said funds. The network events between the datasets are the fraudulent transfer of data between the bank accounts. The intermediate datasets may be thought as being mule accounts. Whereas the source datasets are the accounts from which the data was fraudulently taken.

In this embodiment, the returning of the data to the source accounts is the repatriation of funds back to the account from which the funds were fraudulently taken. The method of FIG. 5 may be a version of Pari-Passu principle. The method of FIG. 6 may be a version of Clayton's Rule principle. It is important that in this financial system that funds (i.e. data) should not be transferred more than once from the dataset it is within. The maximum flow as described in relation to FIG. 13 is the maximum flow of funds through the network such that the largest amount of money can be repatriated.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

As described in relation to FIG. 1 details of the network event 113a may be provided by a third party to the device 705. The identification of the datasets may then be determined through identifying network events starting from first dataset 103. However, in other arrangements the network event 113a may not be provided by a third party. The device 705 may identify the network event 113a and/or dataset 103. In other arrangements, the details of dataset 103 may be provided by the third party, rather than the network event 113a.

As described above, the term neighbouring datasets has been discussed. Neighbouring dataset are datasets that are separated by a single network event. For instance, in relation to FIG. 1 datasets 109 and 105 are neighbouring datasets.

It may also be understood that it may not be necessary to determine if one or more of the datasets are an intermediate or source dataset. For instance, it may not be necessary to determine if dataset 103, or 105 is an intermediate or source dataset. It may be implicit that dataset 103, or 105 is an intermediate dataset. Alternatively, a third party may indicate that dataset 103 or 105 is an intermediate dataset if the third party provides details of the dataset 103 or 105.

Of course the portions of the network 100 shown in FIG. 1 and the network 300 shown in FIG. 3 are just one example of a network. The network may take on any form or combination of datasets, with varying network events between them. For instance, the network 100 shown in FIG. 1 only shows a single network event between each of the datasets. However, multiple network events may occur between each of the datasets. The networks shown in FIGS. 1 and 3 are just simple examples of networks. Typical networks may include from three nodes upwards to many hundreds of nodes. Each node having many network events between them.

As described above, the returning of data associated with the network security threat is carried out by returning the data through each identified intermediate dataset in the network along the flow path that the data has travelled. However, in some arrangements the amount of data to be returned to each source dataset may be determined as described above, but when returning the data the data is sent directly from the destination dataset(s) to the source dataset(s). This is instead of the data passing back through every intermediate node. This may be advantageous, if it is determined that the intermediate nodes are unsecure, which might prevent or hinder the return of the data to the source datasets.

In addition, multiple different data may be identified at the destination dataset to relate to the network security threat. This multiple data may be transferred together back to the source dataset or separately.

In the methods discussed above the data associated with the network security threat has been described as being divisible such that a fraction of the data (or a multiple) may be transferred back to the source. However, the data may not be able to be combined and may instead be transferred separately to the source datasets.

Although it has been described that the past network events that fall within a predefined time period are those which are determined to be related to the network security threat when carrying out the backward and forward tracing, other criteria may be used. In addition, or alternatively, the network events may be evaluated in order to determine if the data sent in the network event is the same data as the data associated with the network security threat. For instance, whether the data has the same value or content as the data associated with the network security threat. In other arrangements, the nature of the dataset to which the network event is sending data to may be further criteria to determine whether the network event is related to the network security threat. For instance, the geographical location associated with the dataset (as discussed previously) may be used as an indication as to whether the network event is associated with the network security threat.

It may be known that datasets associated with certain geographical locations are more likely to be associated with one or more network security threats. In other scenarios, the geographic location associated with the identified dataset may be compared to the geographical location of the first dataset/destination dataset or its neighbouring nodes in the network to determine whether the dataset is potentially involved in the network security threat. A geographical location that is different to the neighbouring node in the network may be a flag that the identified dataset is involved in the network security threat. This might particularly be the case if the first/destination dataset has never previously had dealings with a dataset associated with such a geographical location.

The number of past network events that were associated with data transfer to or from an identified dataset 103 may also by an indicator as to whether the dataset 103 is involved in providing the data associated with the network security threat. A large number of network events between the identified dataset 103 and the destination dataset 101 may indicate that the identified dataset 103 is involved in illicit activity and therefore relates to the network security threat.

Although FIG. 7 shows a device for performing the methods 200 and 400, any type of device could perform said methods. Alternatively, the method may be performed over multiple devices. For instance, any of modules 707 to 713 could be located over multiple devices.

The invention claimed is:

1. A computer-implemented method for reconstructing a dataset after detection of a network security threat in a network, the method comprising:

determining a maximum flow for returning data associated with the network security threat to a source dataset via each of a plurality of paths through which the data has passed from the source dataset to a destination dataset;

starting from the destination dataset, determining an amount of the data associated with the network security threat to be transferred to each dataset in the plurality of paths between the destination dataset and the source dataset such that the data associated with the network security threat can be returned to the source dataset, wherein the data associated with the network security threat to be transferred in each path is less than or equal to the determined maximum flow for the path;

generating a forensic report based on the determined amount of the data associated with the network security threat to be transferred to each dataset a forensic report; and outputting the forensic report.

2. The method of claim 1, further comprising:

determining the plurality of paths, wherein each of the paths comprises a plurality of network events responsible for a transfer of the data associated with the network security threat, wherein each network event is between neighbouring datasets in a respective path, and wherein each network event comprises:

an obtaining network event through which the data associated with the security threat is originally obtained; and a returning network event which flows in a reverse direction to the obtaining network event and through which the data associated with the security threat is to be returned.

3. The method of claim 2, wherein determining the maximum flow comprises:

(a) determining a theoretical capacity for each returning network event of the plurality of paths;

(b) determining a maximum flow for a first path of the plurality of paths, wherein the maximum flow for the first path is bring equal to a lowest determined theoretical capacity of returning network events of the first path, wherein the determined maximum flow is applied to each returning network event of the first path;

(c) repeating step (b) for each of the plurality of paths; and updating a respective maximum flow for a respective network event of the plurality of paths if the respective network event is associated with multiple paths of the plurality of paths, comprising updating the respective maximum flow for the respective network event to be the smaller of:

a lowest determined theoretical capacity of the respective returning network event associated with the multiple paths; or a sum of lowest determined theoretical capacities of returning network events for of the multiple paths associated with the respective returning network event.

4. The method of claim 3, wherein the determined theoretical capacity for each returning network event of the plurality of paths is equal to a value of the data sent in its associated obtaining network event.

5. The computer implemented method of claim 1, wherein the destination dataset comprises the data associated with the network security threat.

6. The method of claim 1, wherein determining the maximum flow comprises determining the maximum flow using an Edmonds-Karp algorithm.

7. The method of claim 1, wherein the step of determining the amount of the data to be transferred to each dataset in the plurality of paths between the destination dataset and the source dataset further comprises determining the amount of the data to be transferred using a Breadth first search algorithm.

8. The method of claim 1, further comprising automatically returning the data associated with the network security threat based on the forensic report.

9. The method of claim 8, wherein the forensic report is automatically processed by a data processing device such that the data processing device automatically returns the data associated with the network security threat.

10. The method of claim 1, wherein the network is a financial network, and wherein the network security threat is an unauthorised modification of routing information within the financial network.

11. A computer-implemented method for reconstructing a dataset after detection of a network security threat in a network, the method comprising:
 determining a maximum flow for returning data associated with the network security threat to a source dataset via each of a plurality of paths through which the data has passed from the source dataset to a destination dataset;
 starting from the destination dataset, determining the data to be transferred to each dataset in the plurality of paths between the destination dataset and the source dataset such that the data can be returned to the source dataset, the data transferred in each path not exceeding the determined maximum flow for the path;
 adding the details of the determined amount of data to be transferred to a forensic report; and
 outputting the forensic report;
 wherein when the network comprises a plurality of source datasets:
  before determining the maximum flow:
   generating a dummy dataset and dummy network events flowing between the dummy dataset and each of the source datasets; and
  after determining the maximum flow:
   removing the dummy dataset and dummy network events before the step of determining the data to be transferred to each dataset such that the data can be returned to the source datasets.

12. A computer-implemented method for reconstructing a dataset after detection of a network security threat in a network, the method comprising:
 determining a plurality of paths, wherein each of the paths comprises a plurality of network events responsible for a transfer of data associated with the network security threat, each network event being between neighbouring datasets in the path, and wherein each network event comprises:
  an obtaining network event through which the data associated with the security threat is originally obtained; and
  a returning network event which flows in a reverse direction to the obtaining network event and through which the data associated with the security threat is to be returned;
 determining a maximum flow for returning the data associated with the network security threat to a source dataset via each of the plurality of paths through which the data has passed from the source dataset to a destination dataset, wherein determining the maximum flow comprises:
  (a) determining a theoretical capacity for each of the returning network events;
  (b) for a first of the paths: determining a maximum flow for all of the returning network events of the first path, the maximum flow being equal to the determined theoretical capacity of the returning network events in the first path that has the lowest value, such that the same maximum flow applies to all of the returning network events of the first path; and
  (c) repeating step (b) for each of the paths; and wherein if one or more returning network events are associated with multiple paths the maximum flow of these particular returning network events is updated to be the smaller of:
   the determined theoretical capacity of the returning network events associated with multiple paths that has the lowest value; or
   a sum of the lowest determined theoretical capacity of the returning network events in each of the paths that the one or more returning network events are associated with;
 starting from the destination dataset, determining the data to be transferred to each dataset in the plurality of paths between the destination dataset and the source dataset such that the data can be returned to the source dataset, the data transferred in each path not exceeding the determined maximum flow for the path, and wherein determining the data to be transferred to each dataset in the plurality of paths between the destination dataset and the source dataset comprises:
  (i) starting from the destination dataset, determining the value of data to transfer through each returning network event between the destination dataset and its neighbouring datasets, the determining based on the value of the data available at the destination network dataset and the maximum flow for the path the returning network event is associated with;
  (ii) starting from each of the destination dataset's neighbouring datasets, determining the value of data to transfer through each returning network event between this dataset and its neighbouring datasets, the determining based on the value of the data that has been determined to be transferred to this dataset and the maximum flow for the path the returning network event is associated with; and
  (iii) repeating step (ii) for each of the datasets along each of the paths until it is determined how the data is to be returned to the source dataset;
 adding the details of the determined amount of data to be transferred to a forensic report; and
 outputting the forensic report.

13. A computer-implemented method for reconstructing a dataset after detection of a network security threat in a network, the method comprising:
 determining a plurality of paths, wherein each of the paths comprises a plurality of network events responsible for a transfer of data associated with the network security threat, each network event being between neighbouring datasets in the path, and wherein each network event comprises:
  an obtaining network event through which the data associated with the security threat is originally obtained; and
  a returning network event which flows in a reverse direction to the obtaining network event and through which the data associated with the security threat is to be returned;
determining a maximum flow for returning the data associated with the network security threat to a source dataset via each of the plurality of paths through which the data has passed from the source dataset to a destination dataset, wherein determining the maximum flow comprises:
  (a) determining a theoretical capacity for each of the returning network events;
  (b) for a first of the paths: determining a maximum flow for all of the returning network events of the first path, the maximum flow being equal to the determined theoretical capacity of the returning network events in the first path that has the lowest value, such that the same maximum flow applies to all of the returning network events of the first path; and
  (c) repeating step (b) for each of the paths; and wherein if one or more returning network events are associated with multiple paths the maximum flow of these particular returning network events is updated to be the smaller of:
    the determined theoretical capacity of the returning network events associated with multiple paths that has the lowest value; or
    a sum of the lowest determined theoretical capacity of the returning network events in each of the paths that the one or more returning network events are associated with;
starting from the destination dataset, determining the data to be transferred to each dataset in the plurality of paths between the destination dataset and the source dataset such that the data can be returned to the source dataset, the data transferred in each path not exceeding the determined maximum flow for the path, and wherein determining the data to be transferred to each dataset in the plurality of paths between the destination dataset and the source dataset further comprises:
  at each dataset where there is more than one returning network event:
    summing the value of the data originally sent to the dataset in each of the obtaining network events associated with that dataset;
    determining a percentage contribution of data each obtaining network event made to the summed total; and
    determining the amount of data to be transferred via each of the returning network events by multiplying the contribution of its associated obtaining network event by the available value of data at the dataset, and where this exceeds the maximum flow for that returning network event setting the amount of data to be transferred to be equal to the maximum flow;
adding the details of the determined amount of data to be transferred to a forensic report; and
outputting the forensic report.

14. A system configured to reconstruct a dataset after detection of a network security threat in a network, the system comprising:
  a dataset reconstructing module configured to:
    determine a maximum flow for returning data associated with the network security threat to a source dataset via each of a plurality of paths through which the data has passed from the source dataset to a destination dataset;
    starting from the destination dataset, determine an amount of the data associated with the network security threat to be transferred to each dataset in the plurality of paths between the destination dataset and the source dataset such that the data associated with the network security threat can be returned to the source dataset, wherein the data associated with the network security threat to be transferred in each path is less than or equal to the determined maximum flow for the path; and
  a forensic report generating module configured to:
    generate a forensic report based on the determined amount of the data associated with the network security threat to be transferred to each dataset; and
    output the forensic report.

15. A non-transitory computer-readable storage medium storing instructions thereon which, when executed by a processor, cause the processor to perform a method for reconstructing a dataset after detection of a network security threat in a network, the method comprising:
  determining a maximum flow for returning data associated with the network security threat to a source dataset via each of a plurality of paths through which the data has passed from the source dataset to the destination dataset;
  starting from the destination dataset, determining an amount of the data associated with the network security threat to be transferred to each dataset in the plurality of paths between the first dataset and the one or more source datasets such that the data associated with the network security threat can be returned to the one or more source datasets, wherein the data associated with the network security threat to be transferred in each path is less than or equal to the determined maximum flow for the path;
  generating a forensic report based on the determined amount of the data associated with the network security threat to be transferred to each dataset; and
  outputting the forensic report.

* * * * *